(12) United States Patent
Busby

(10) Patent No.: US 10,801,215 B2
(45) Date of Patent: Oct. 13, 2020

(54) FLOORING SUPPORT SYSTEM

(71) Applicant: Phillip Busby, Sioux Falls, SD (US)

(72) Inventor: Phillip Busby, Sioux Falls, SD (US)

( * ) Notice: Subject to any disclaimer, the term of this patent is extended or adjusted under 35 U.S.C. 154(b) by 0 days.

(21) Appl. No.: 16/384,808

(22) Filed: Apr. 15, 2019

(65) Prior Publication Data

US 2020/0190827 A1   Jun. 18, 2020

Related U.S. Application Data

(63) Continuation-in-part of application No. 16/218,340, filed on Dec. 12, 2018.

(51) Int. Cl.
  *E04F 15/024*   (2006.01)
  *E04F 15/02*   (2006.01)
  *F16B 43/00*   (2006.01)

(52) U.S. Cl.
  CPC .. *E04F 15/02194* (2013.01); *E04F 15/02005* (2013.01); *E04F 15/02044* (2013.01); *F16B 43/00* (2013.01); *F16B 2043/008* (2013.01)

(58) Field of Classification Search
  CPC .............. E04F 15/024; E04F 15/02405; E04F 15/02411; E04F 15/02447; E04F 15/02458; E04F 15/02464; E04F 15/0247; E04F 15/02476; E04F 15/02482; E04F 15/02194; E04F 15/02005; E04F 15/02044; F16B 43/00
  USPC ............... 52/126.6, 126.7, 220.2, 220.5, 263
  See application file for complete search history.

(56) References Cited

U.S. PATENT DOCUMENTS

| | | | | |
|---|---|---|---|---|
| 3,606,704 A | * | 9/1971 | Denton | E04F 15/024 52/167.8 |
| 7,866,096 B2 | * | 1/2011 | Lee | E04F 15/02476 248/351 |
| 8,690,109 B2 | * | 4/2014 | Haworth | F16B 43/009 248/218.4 |
| 2008/0141601 A1 | * | 6/2008 | Mead | E04F 15/02452 52/263 |
| 2010/0058679 A1 | * | 3/2010 | Greaves | E04D 12/006 52/126.6 |
| 2010/0257796 A1 | * | 10/2010 | Bertke | E04F 11/1812 52/263 |
| 2014/0366461 A1 | * | 12/2014 | Busby | E04F 15/02044 52/126.6 |
| 2015/0184398 A1 | * | 7/2015 | Tabibnia | E01C 5/00 52/105 |

* cited by examiner

*Primary Examiner* — William V Gilbert
(74) *Attorney, Agent, or Firm* — Mark S Hubert

(57) ABSTRACT

A flooring substrate system that uses one of three substrate components upon which various types of finish flooring may be attached above a deck structure. The deck structure may be open lumber framed or may be a waterproofed planar surface. Affixation of the flooring system may be by direct connection or by gravitational placement. Height and slope adjustable components interlock through a plunge, twist and locking teeth arrangement to form supporting members beneath the substrate components. A special fastening system is utilized between two of the substrate components to provide lateral stability to the top reversible structural panel.

8 Claims, 48 Drawing Sheets

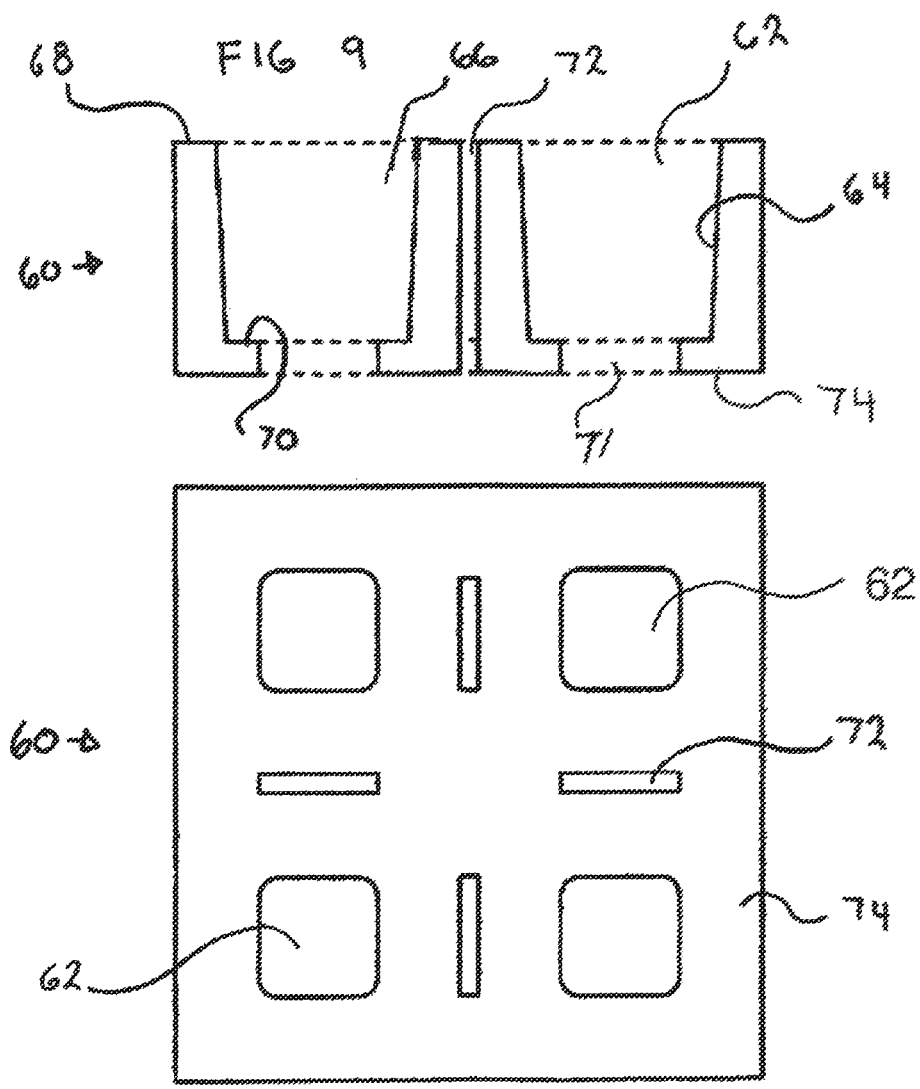

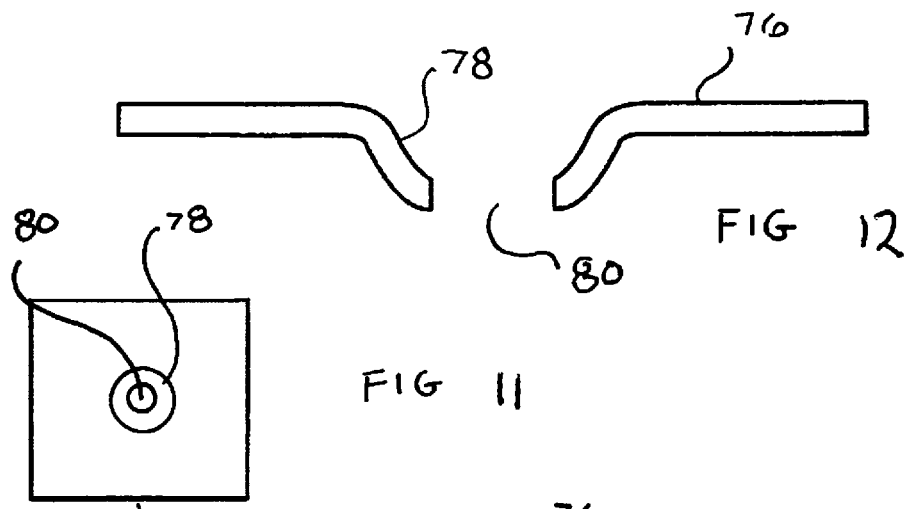
FIG 11
FIG 12
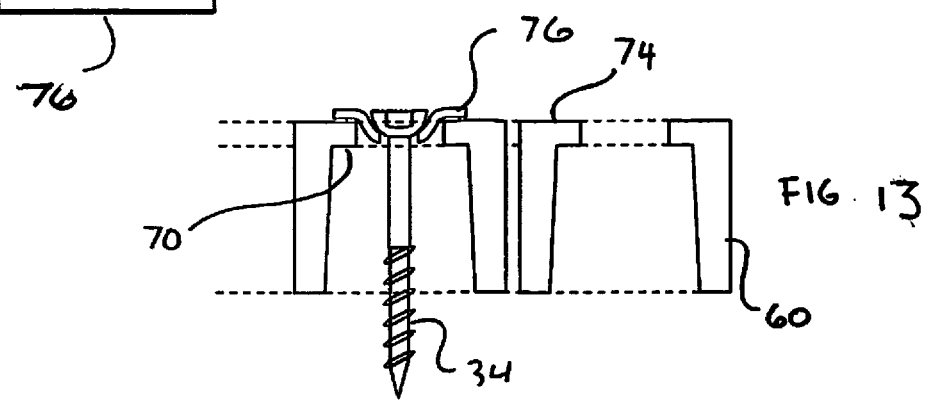
FIG 13
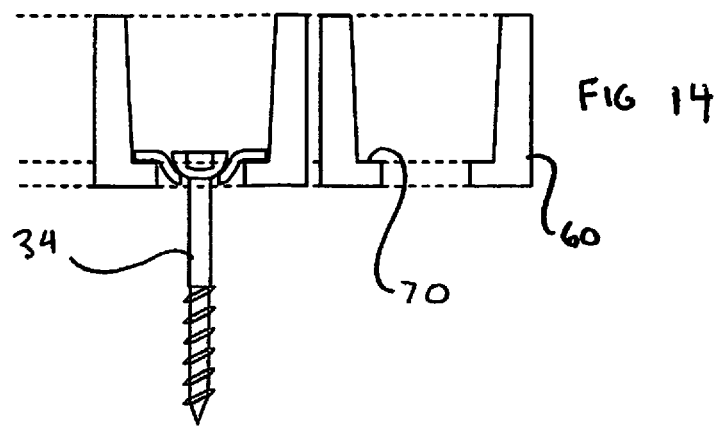
FIG 14

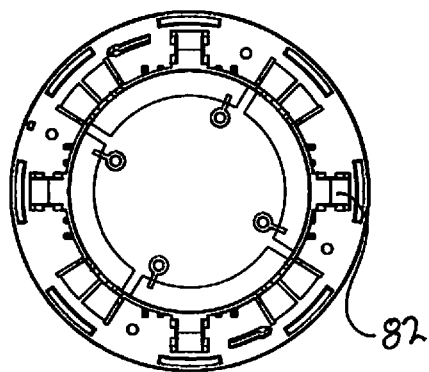
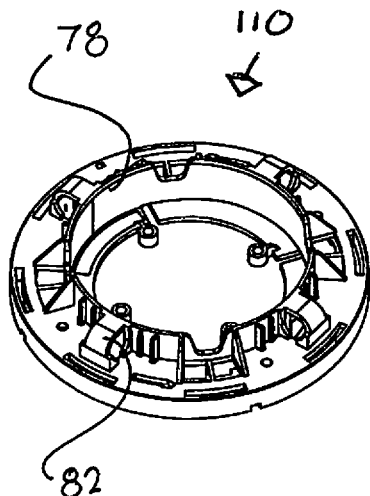
FIG. 64           FIG. 63
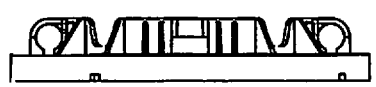
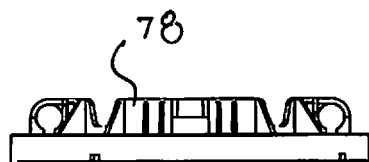
FIG. 65           FIG. 66
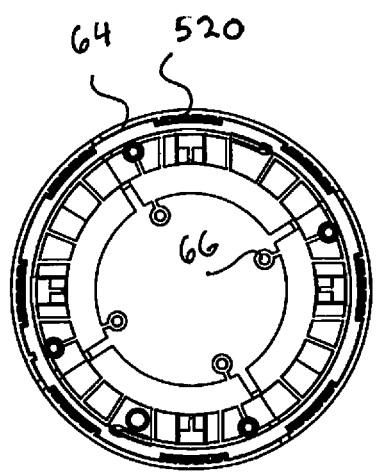
FIG. 67

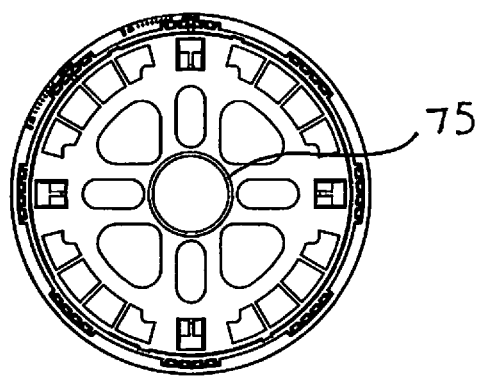
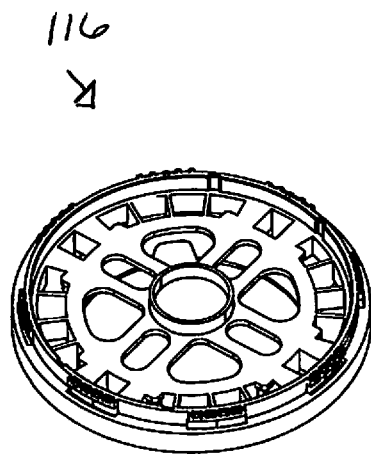
FIG. 69                    FIG. 68
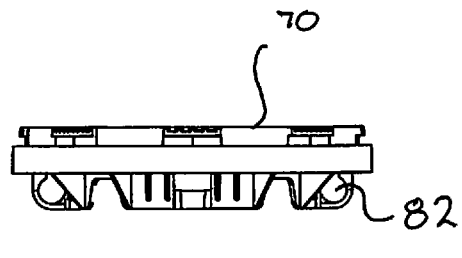
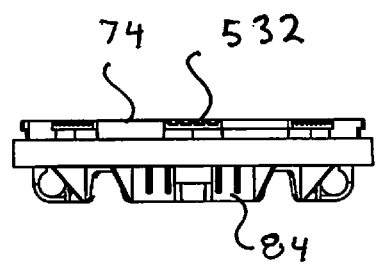
FIG. 70                    FIG. 71
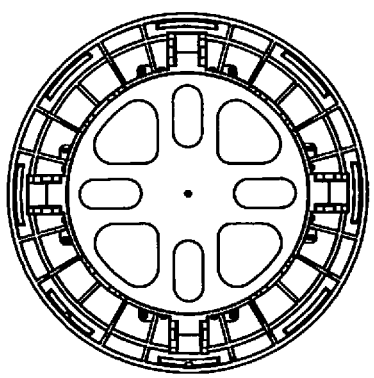
FIG. 72

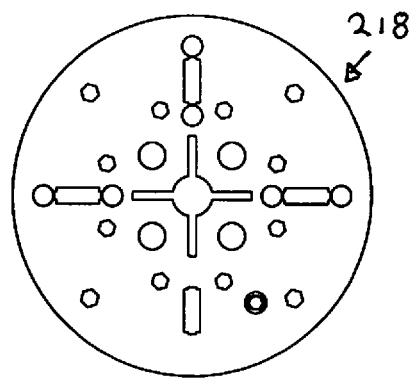
FIG. 89
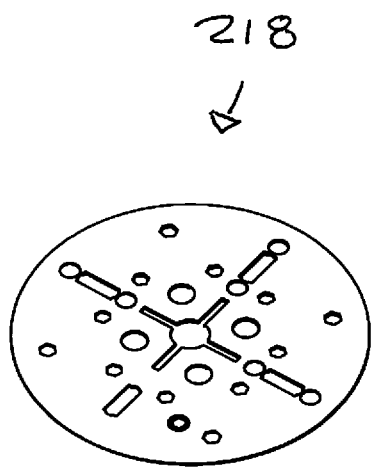
FIG. 88
FIG. 90
FIG. 91

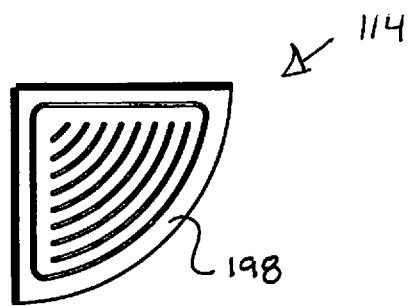
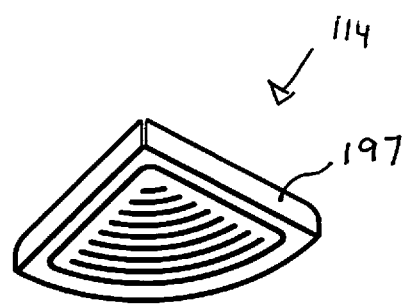
FIG. 93    FIG. 92
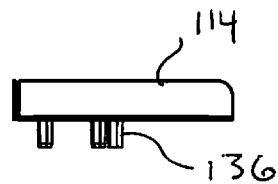
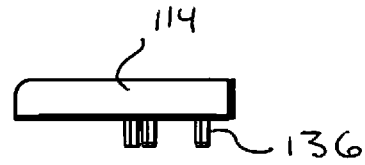
FIG. 94    FIG. 95

FLOORING SUPPORT SYSTEM

CLAIM FOR DOMESTIC PRIORITY

This application is a continuation in part of U.S. patent application Ser. No. 16/218,340 entitled "FLOORING SUPPORT SYSTEM" filed Dec. 12, 2018, which is a continuation in part of U.S. patent application Ser. No. 14/918,336 filed Oct. 20, 2015 entitled "FLOORING SUBSTRATE SUPPORT SYSTEM" which is a continuation in part of U.S. Pat. No. 9,499,992 filed Jun. 13, 2014 entitled "PRECISION HEIGHT ADJUSTABLE FLOORING SUBSTRATE SUPPORT SYSTEM" which claims benefit of U.S. Provisional Patent Application No. 61/834,989 filed Jun. 14, 2013 entitled "PRECISION HEIGHT ADJUSTABLE FLOORING SUBSTRATE SUPPORT SYSTEM".

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to an outdoor flooring support system, and more particularly to a system based around three flooring substrate support components, two of which are structural panels and one that is a plate, that may be utilized in a plethora of ways with additional accessory components to accommodate the installation of flooring (such as tiles and pavers) for decks, rooftop terraces, patios and the like. Its novelty lies in its ability for enabling waterproofed surfaces that lack suitable, level, structural features such as rooftops of commercial buildings, as well as open timber frames to accommodate decks, rooftop terraces or patios.

BACKGROUND

Stone or stone-like walkways, terraces, patios and steps are frequently used at homes and businesses, as the appearance is attractive and enjoyed by many. Generally, these stones must be laid onto a level, on-grade, foundation. Walkway and step stones are typically rather thick, to provide sufficient internal structural properties to support weight necessary in walkway and step use. In addition, thin-gauged stones used in this same manner, with no internal structural properties, require a thick concrete pad for support.

Many residential second floor decks are sloped for drainage or are above waterproofed lower decks or living spaces and as such cannot tolerate mechanical penetrations that would breach the integrity of the deck's protective waterproofing. Common commercial roofs or decks have multiple slopes and numerous protrusions such as drains or vents and must have an elevated, level, flooring substrate system above the waterproofing to attach and or support the stones in order to present an aesthetically attractive and structurally stable planar array of stone. For joist framed decks to be finished with the same stone or stone-like material, would require a solid, level, water resistant structural support spanning between multiple joist framing. This is not possible without breaking the rooftop membrane or seal that keeps the water out and allows any drainage to run off. Additionally, once decking is to be used above grade, wind lift forces may pose structural issues.

Henceforth, an outdoor flooring, deck, rooftop terrace and patio surface system that accommodates the attachment of a level, solid substrate for the attachment of outdoor flooring, would fulfill a long felt need in the construction industry. This new invention utilizes and combines known and new technologies in a unique and novel configuration to overcome the aforementioned problems and accomplish this.

BRIEF SUMMARY

In accordance with various embodiments, an outdoor flooring support system is provided that offers three different flooring substrates that may have flooring permanently or temporarily affixed to their top surfaces.

In one aspect, an outdoor flooring support system that may be mechanically coupled or gravitationally stacked in place so as to be rigidly attached to the underlying structure or to float atop the underlying structure.

In another aspect, an outdoor flooring support system that may make a unitary floor through the attachment of the flooring onto the structural panels or by connection of the substrate panels with the accessory components.

In another aspect, an outdoor flooring support system that is capable of suspending/supporting a drainable array of flooring over the underlying structure without compromising the waterproof integrity of the structure.

In yet another aspect, an outdoor flooring support system adaptable for installation over uneven, sloped structures or open wood framed structures.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 9 is a cross sectional view of a pair of adjacent cells of a reversible structural panel;

FIG. 10 is a close up bottom view of a reversible structural panel;

FIG. 11 is a top view of a reversible structural panel retaining clip;

FIG. 12 is a side cross sectional view of a reversible structural panel retaining clip;

FIG. 13 is a side cross sectional view of a reversible structural panel installed top face down;

FIG. 14 is a side cross sectional view of a reversible structural panel installed top face up:

FIG. 63 is a perspective view of the stanchion bottom plate;

FIG. 64 is a top view of the stanchion bottom plate;

FIG. 65 is a side view of the stanchion bottom plate;

FIG. 66 is a side view of the stanchion bottom plate rotated 90 degrees;

FIG. 67 is a bottom view of the stanchion bottom plate;

FIG. 68 is a perspective view of the stanchion top plate;

FIG. 69 is a top view of the stanchion top plate;

FIG. 70 is a side view of the stanchion top plate;

FIG. 71 is a side view of the stanchion top plate rotated 90 degrees;

FIG. 72 is a bottom view of the stanchion top plate;

FIG. 88 is a perspective view of the ½° wedge plate;

FIG. 89 is a top view of the ½° wedge plate;

FIG. 90 is a side view of the ½° wedge plate;

FIG. 91 is a side view of the ½° wedge plate rotated 90 degrees;

FIG. 92 is a perspective view of the paver plate;

FIG. 93 is a top view of the paver plate;

FIG. 94 is a side view of the paver plate;

FIG. 95 is a side view of the paver plate rotated 90 degrees;

DETAILED DESCRIPTION OF CERTAIN EMBODIMENTS

Figure 1:
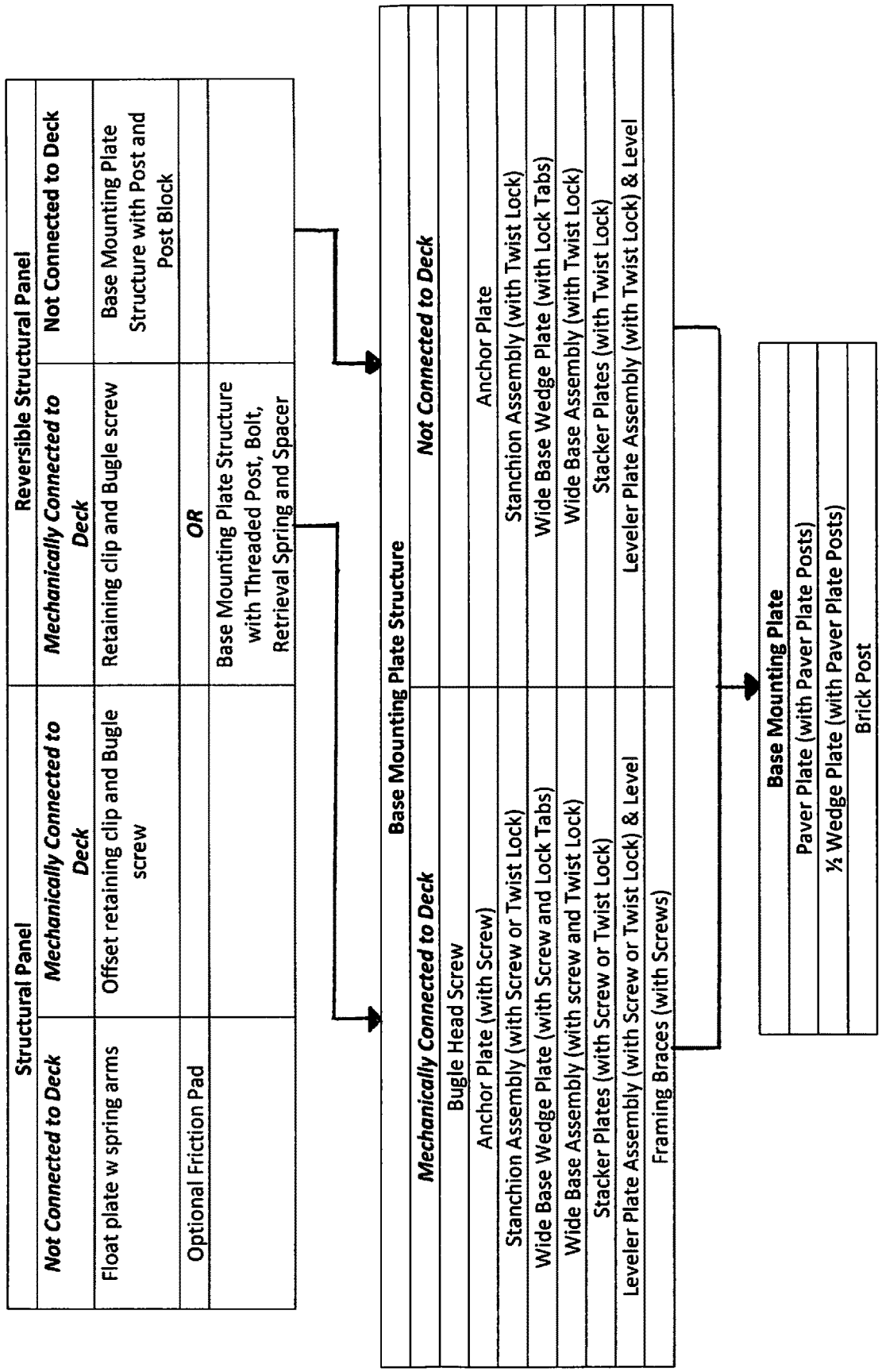
FIG. 1 is a flowchart of the various flooring support system elements, indicating their interconnectivity.
Figure 2:
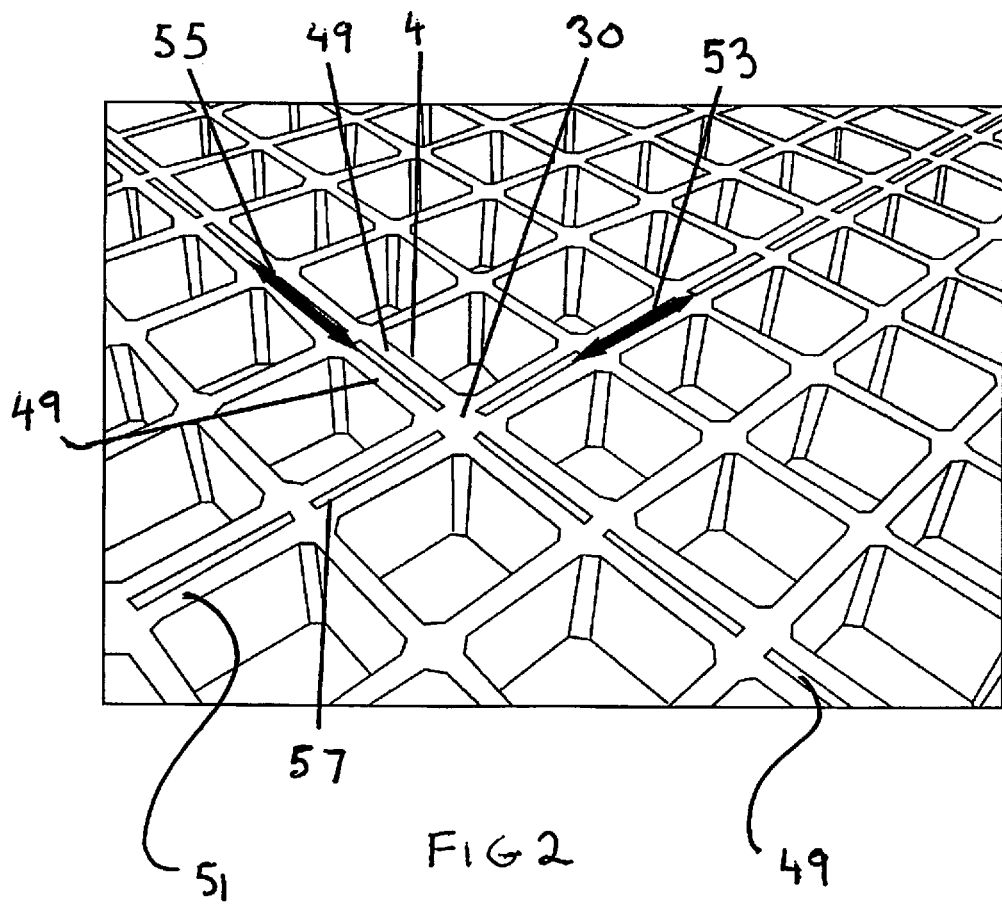
FIG. 2 is a top perspective view of the structural support panel.
Figure 3:
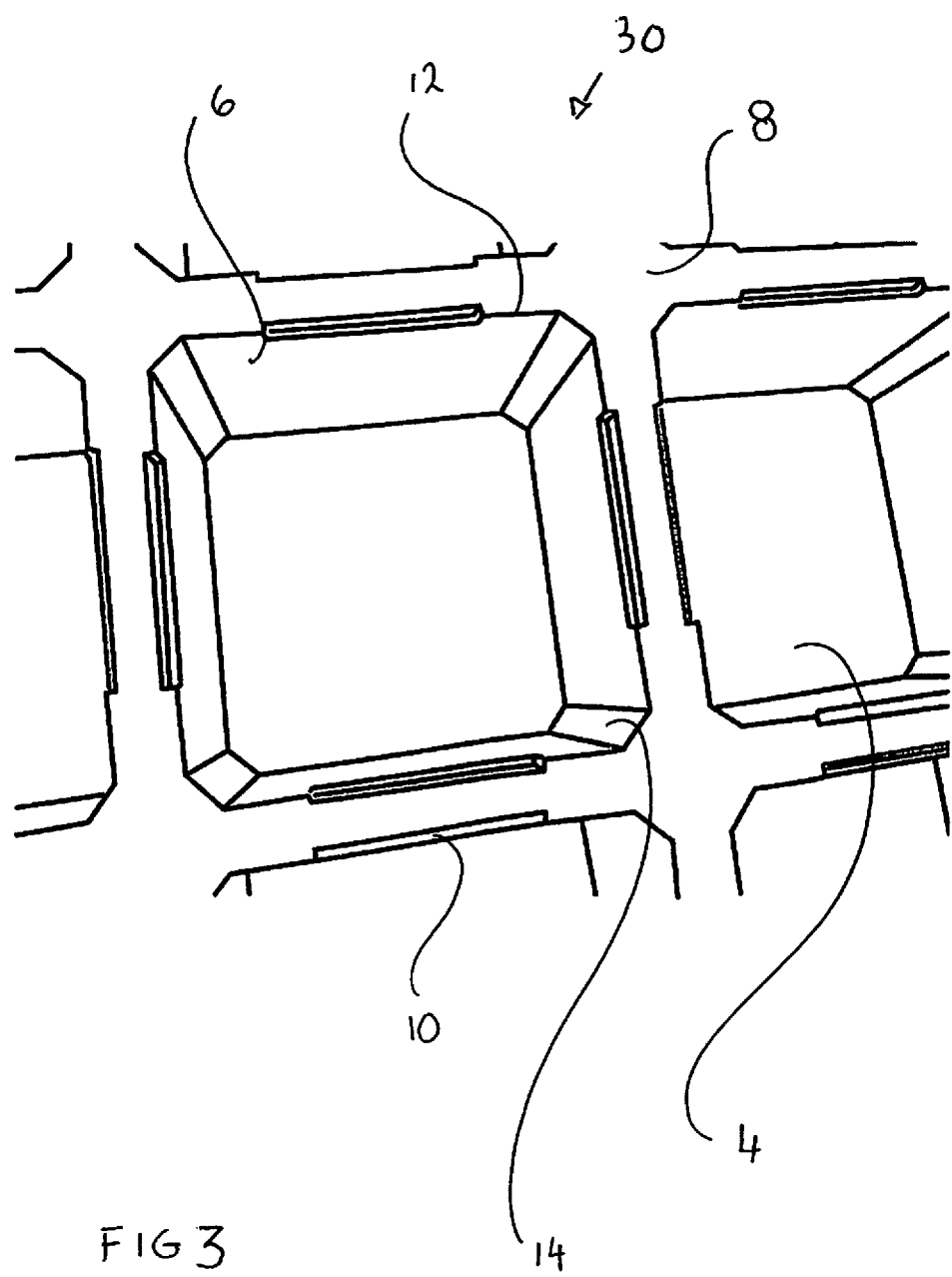
FIG. 3 is a close up top view of the structural support panel.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another.

It will be understood that when an element is referred to as being "on," "coupled to," or "connected to" another element, it can be directly on, directly coupled to or directly connected to the other element, or intervening elements may be present. In contrast, when an element is referred to as being "directly on, "directly coupled to," or "directly connected to" another element, there are no intervening elements present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise.

It will also be understood that the term "and/or" as used herein refers to and encompasses any and all possible combinations of one or more of the associated listed items. Unless otherwise indicated, all numbers herein used to express quantities, dimensions, and so forth, should be understood as being modified in all instances by the term "about."

In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "timber framed" refers to a method of construction that utilizes dimensional lumber such as 2×, 4×, 6× and the like and plywood that are nailed, screwed or glued together to make a structure.

As used herein, the term "flooring" refers to tiles, stone, pavers, bricks, or the equivalent finish flooring options.

As used herein, the term "bowl head" refers to a screw head with a configuration that is semi-spherical beneath its planar driving face.

As used herein, the term "deck" refers to a decking structure having a planar base like a roof (sloped or otherwise) whether it has a contiguously planar surface or is an open, structure made of framing members such as dimensional lumber, that the flooring support system is to support the flooring above.

As used herein, the term "substrate component" is the top component of the flooring support system to which the flooring is attached to or laid upon, thus the term substrate.

As used herein, the term "component" refers to all of remaining elements of the flooring support system that are connected directly or indirectly to the substrate components to adjust for the decking slope, height, wind lift load, method of flooring attachment or mechanical attachment of the floor support system to the deck.

As used herein the terms "IFT and OFT" refer to inward facing teeth and outward facing teeth which reside on the circular perimeter of the faces of the various components and base mounting plate of the flooring support system. These teeth are matingly engageable, evenly radially spaced series of tabs that comprise the twist lock feature that interlocks the various components. The radial spacing between tabs is greater than the length of the tabs to allow a plunge to mate the plates before the twist. The IFT have a slot with an end tab that retains the OFT when the components are brought together and twisted to lock.

The present invention relates to a novel design for a flooring support system that serves as the support structure for the placement of finish flooring materials such as pavers, stone, brick, tile and the like, that are used to form a deck or patio. The complete system has 31 components. This system is designed to be used atop an underlying structure (generically referred to as "a deck") that it is mechanically attached to or to which it gravitationally resides on (non-mechanical attachment).

The present invention is also designed to maintain the integrity of waterproofed underlying structures. It may be attached to concrete, polymer, timber framed or metal underlying structures. This system is used in both residential and commercial applications. It may be used in high wind load conditions or zero wind load conditions. It may be used with removable flooring or it may be integrated with a unitary floor. It is designed to allow drainage between the separate flooring elements. However, one of its most novel features is that it can support a perfectly horizontally floor as the configurations of the flooring support system components accommodate precise correction of the underlying deck's slope and height.

The flooring support system provides a plethora of possible configurations used to overcome field conditions of height, slope, wind lift load and method of flooring affixation. FIG. 1 is a flowchart that illustrates the three substrate components and the other components of the system and their connective relationships. TABLE A presents the substrate components and components with reference to their figures, their element numbers, their function and what can be placed/connected above and below them. TABLE B presents the structural differences of the substrate components and components of the flooring support system, and delineates their novel structural features that allow their interconnectivity and function.

The description of each flooring support system substrate component, component and component assemblies should be read with reference to FIG. 1, TABLE A, TABLE B and the associated figures.

The flooring support system ("system") has three different substrate components that the flooring either is affixed to permanently so as make a unitary floor, or that the flooring floats on to accommodate the removal of individual flooring elements. Adjacent flooring elements are to be spaced for drainage there between, as no grout is utilized. The three substrate components are the structural panel 30, the reversible structural panel 60 and the base mounting plate 4. It is to be noted that the base mounting plate 4 may serve as a component if placed beneath the reversible structural panel 60.

These substrate components and their combinations of components may be mechanically affixed to the deck or these substrate components and their combination of components may gravitationally reside on the underlying deck. The substrate components connect in a plethora of configurations with the components (non substrate) to adjust for the slope, height, wind lift loads as well as the method of affixation of the flooring to the substrate components or the floor support system to the deck. These components may interlock or mechanically connect with the substrate components and other components or they may just gravitationally reside thereon.

The mechanical connection feature is enabled by screws through the base mounting plate 4, the stanchion bottom plate 110, the wide base wedge plate 225, the anchor plate 2, the stacker plate 216, or the framing braces 212; by bowl head screws 34 through offset panel retaining clips 32 in a structural panel 30; by bowel head screws through reversible panel retaining clips 76 in a reversible structural panel 60; and by the twist and lock features of the stanchion top plate 116, the base mounting plate 4, the stacker plates 216, the leveler top plate 213, and the leveler bottom plate 215 as will be described in detail herein.

Looking at FIG. 1 a general overview of the system can best be seen. The structural panel may be directly connected to the deck by screwing, or it may be gravitationally connected so as to float on top of the deck. The reversible structural panel may be directly connected to the deck in either of two ways: by screwing or by bolted connection to a base mounting plate structure that has been directly connected to the deck. The reversible structural panel may float on top of the deck by a laterally stabilized gravitational attachment to a base connection plate that is gravitationally connected to the deck. The base connection plate may be directly connected to the deck itself or by any combination of components that are screwed to the deck and mechanically connected to each other thereafter. The base connection plate may also be gravitationally connected to the deck itself or through any combination of components that are mechanically connected to each other. The components of the system have a unique twist and lock system or a locking tab to interconnect them. On its top surface, the base connection plate accommodates either the reversible structural panel with the post/threaded post or the paver plates and brick posts.

TABLE A

COMPONENT CONNECTIVITY OF THE FLOORING SUBSTRATE SUPPORT SYSTEM

Figure 6:
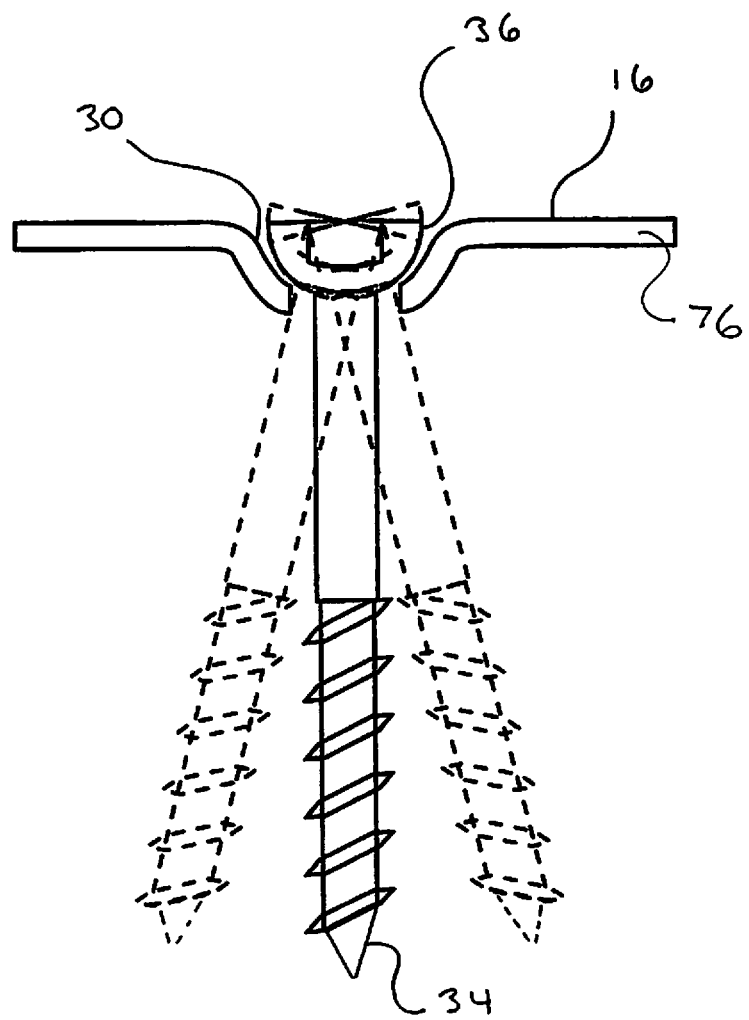
FIG. 6 is a cross sectional view of a bowl head screw in a matingly conformed hemispherical indentation of a retaining clip.
Figure 7:
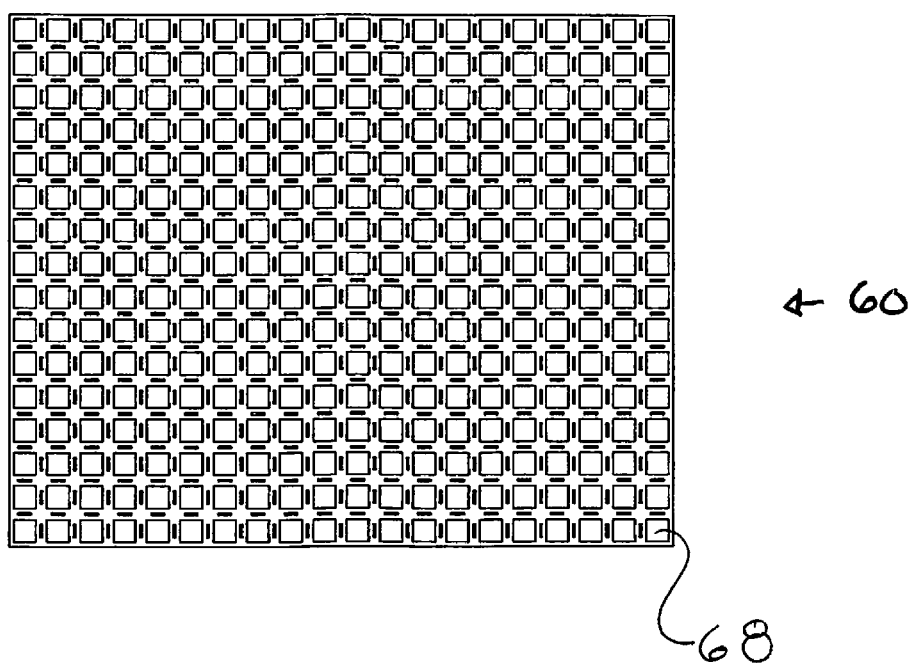
FIG. 7 is a top view of a reversible structural panel.
Figure 8:
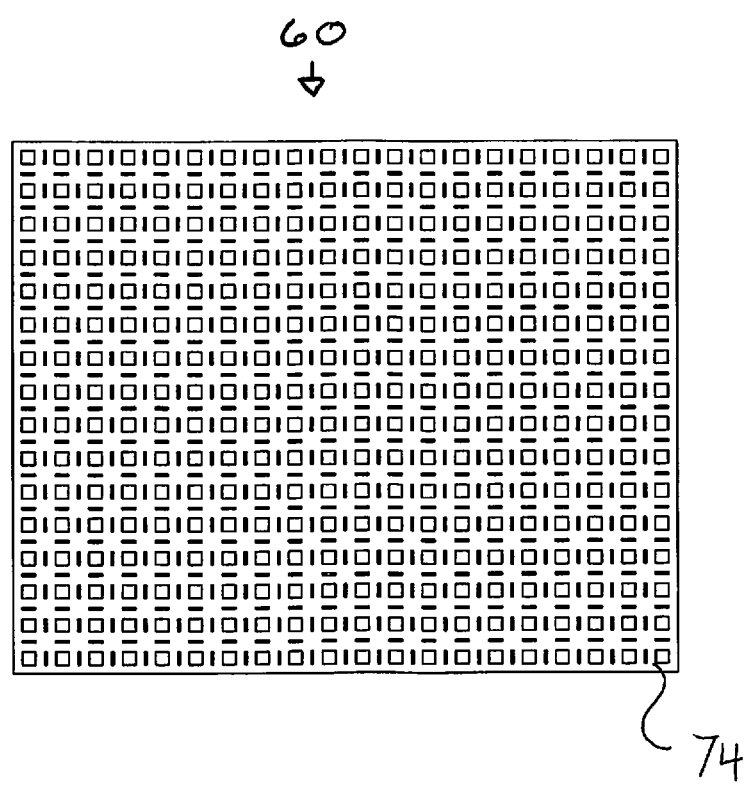
FIG. 8 is a bottom view of a reversible structural panel.
Figure 15:
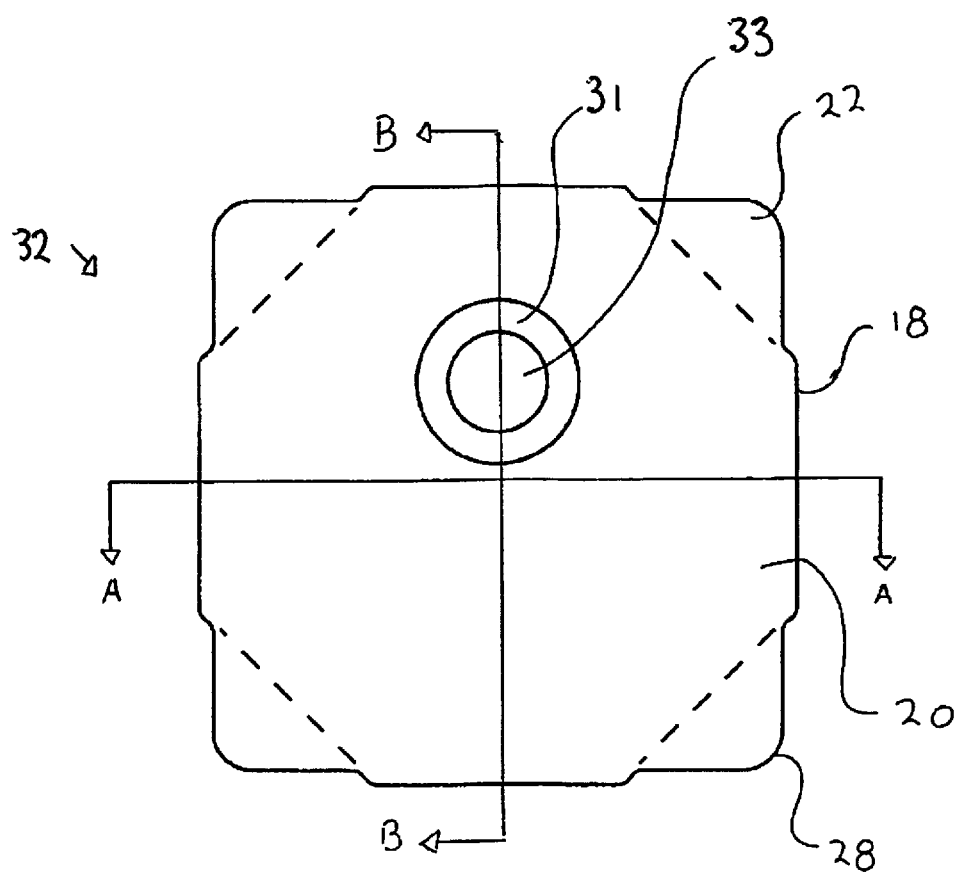
FIG. 15 is a top view of a reversible structural panel clip.
Figure 16:
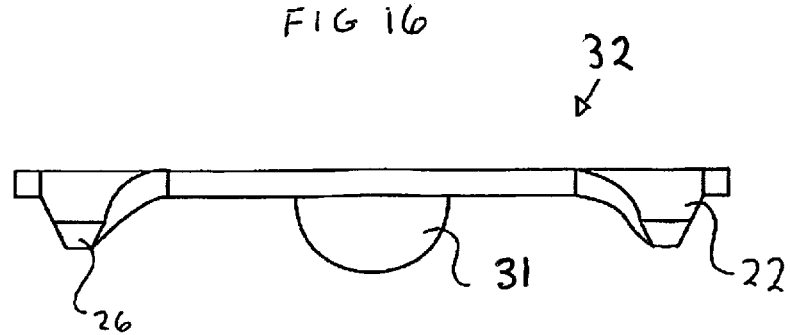
FIG. 16 is a side cross sectional view of a reversible structural panel clip.
Figure 17:
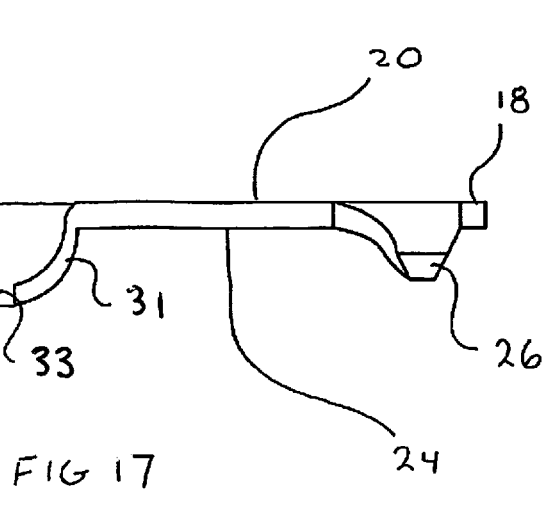
FIG. 17 is a side cross sectional view of a reversible structural panel clip rotated 90 degrees.
Figure 22:
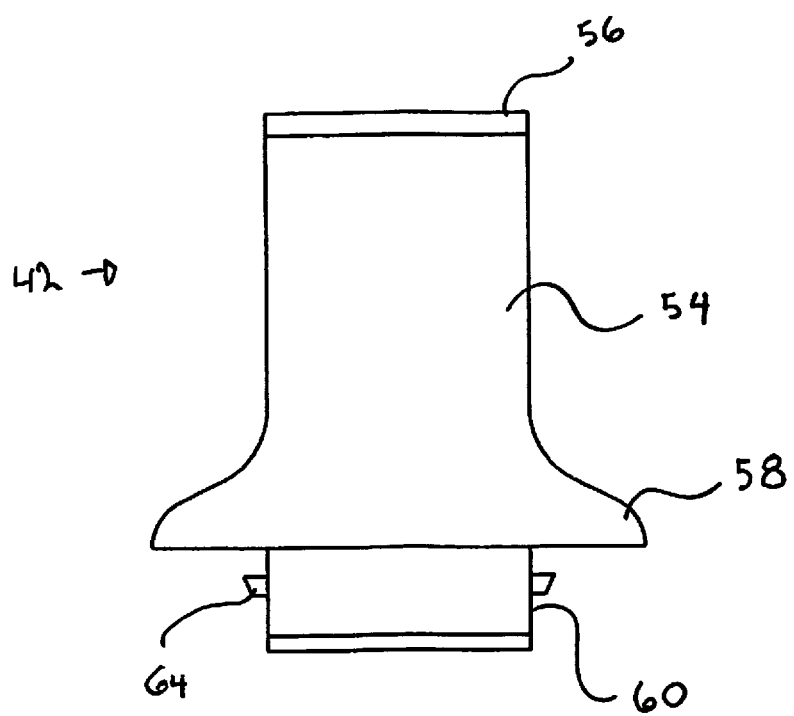
FIG. 22 is a front view of a spring arm.
Figure 20:
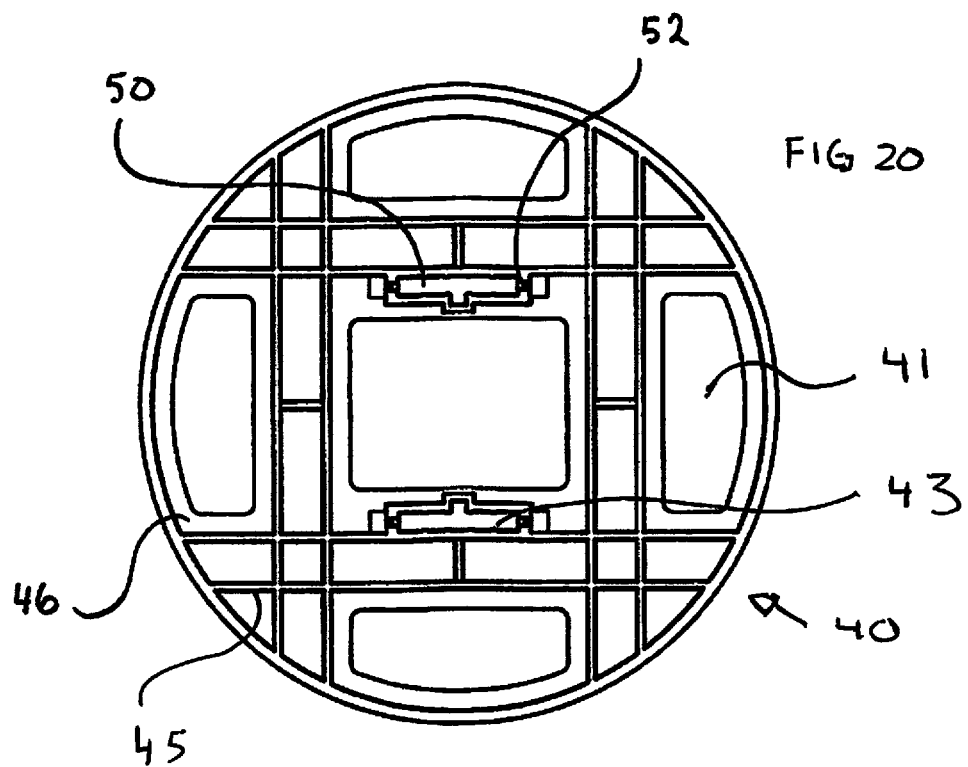
FIG. 20 is a top view of a float plate.
Figure 21:
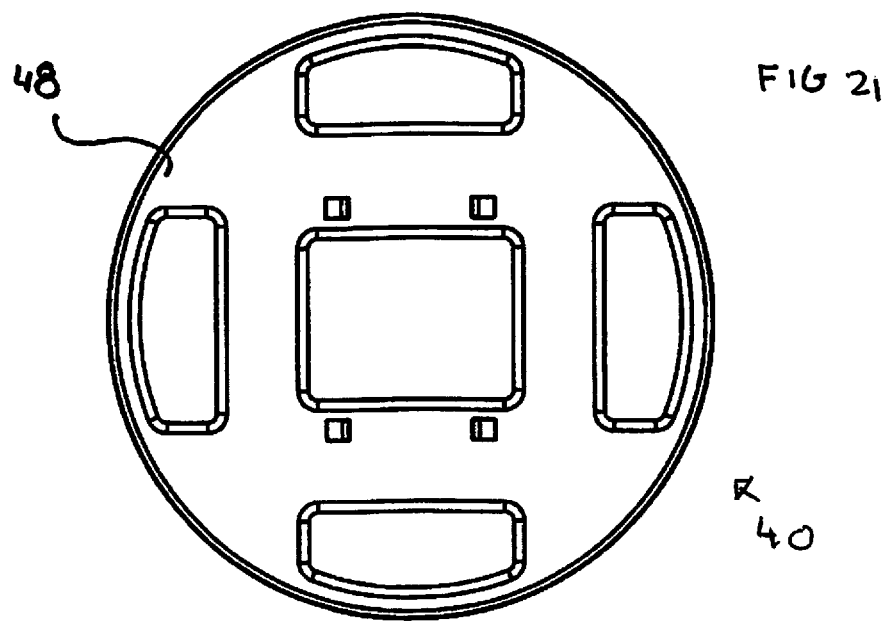
FIG. 21 is a bottom view of a float plate.
Figure 23:
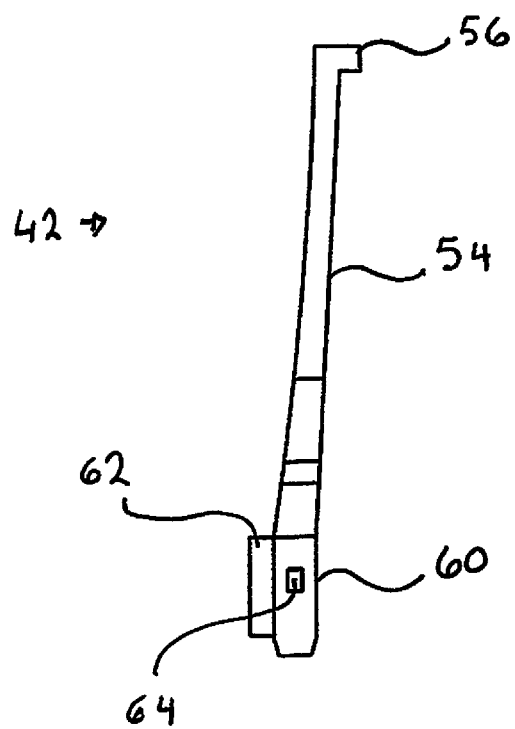
FIG. 23 is a side view of a spring arm.
Figure 24:
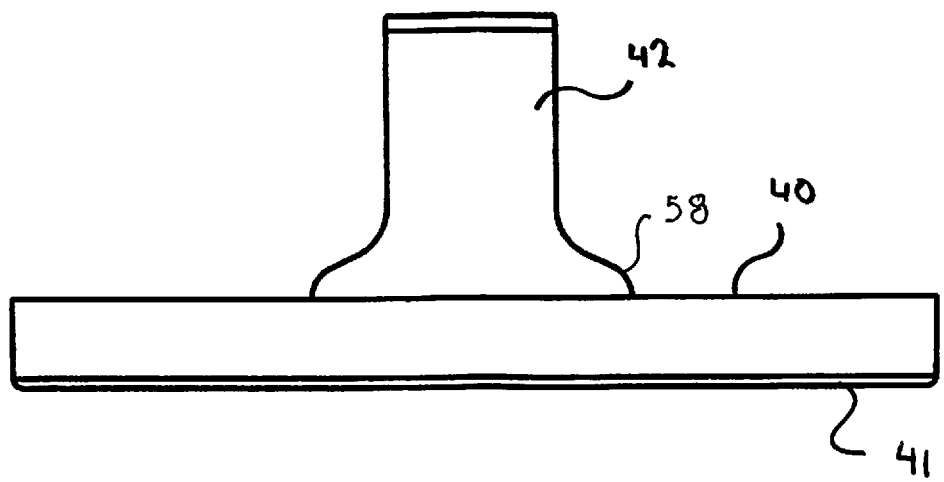
FIG. 24 is a front view of a spring arm mounted on a float plate with a adhesive friction disk.
Figure 25:
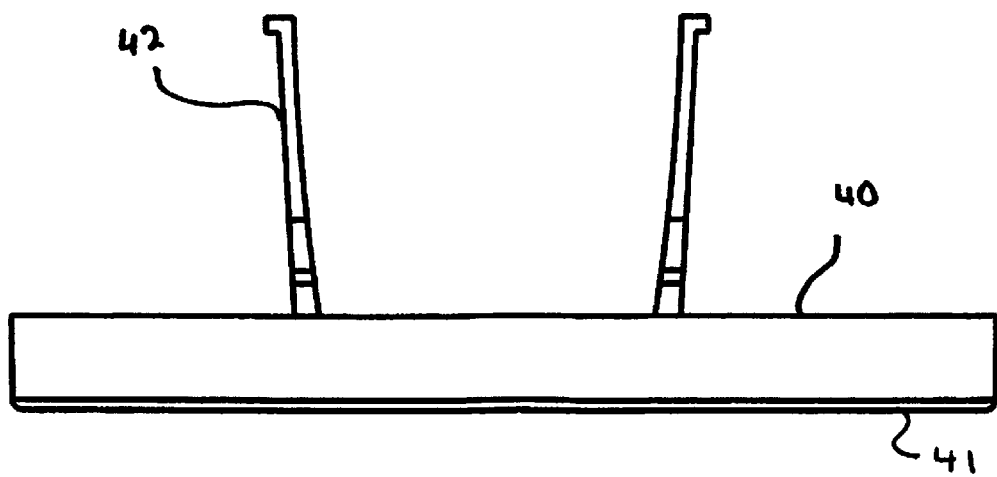
FIG. 25 is a side view of a pair of spring arms mounted on a float plate with a adhesive friction disk.

| ID | Name | Function | Positioned Above | Positioned Below |
|---|---|---|---|---|
| FIRST SUBSTRATE COMPONENT ASSEMBLY | | | | |
| FIGS. 2-5 Element 30 | Structural Panel | Provide surface to attach thin, small flooring | Structure | Thin, small flooring |
| FIGS. 15-17 Element 32 | Offset Panel Retaining Clip | Attaches structural panel to deck | Structural Panel | Thin small tiles |
| FIGS. 18, 19 Element 34 | Bowl Head Screw | Attach Retaining Clip to Deck | Thin, small tiles | Retaining Clip |
| FIGS. 19-21 Element 40 | Float plate | Connects structural panel to waterproofed deck | $2^{nd}$ Panel | Structure |
| FIGS. 22, 23, 24 Element 42 | Spring Arms | Connects Structural Panel to Float Plate | Float Plate | Reversible Panel |
| FIGS. 19, 24, 25 Element 41 | Adhesive Friction Disk (Optional) | Adheres to bottom of Float Plate | Deck | Float Plate |
| Second Substrate Component Assembly | | | | |
| FIGS. 7-10 Element 60 | Reversible Structural Panel | Provide surfaces to attach any flooring | Deck, Base Mounting Plate | Flooring, Paver Plates, Brick Post |
| FIGS. 6, 11, 12 Element 76 | Reversible Panel Retaining Clip | Attach Reversible Structural Panel to deck | Reversible Structural Panel | Deck |
| FIGS. 6, 18 Element 34 | Bowl Head Screw | Attach Reversible Retaining Clip to deck | Thin, small tiles | Retaining Clip |

TABLE A-continued

COMPONENT CONNECTIVITY OF THE FLOORING SUBSTRATE SUPPORT SYSTEM

Figure 34:
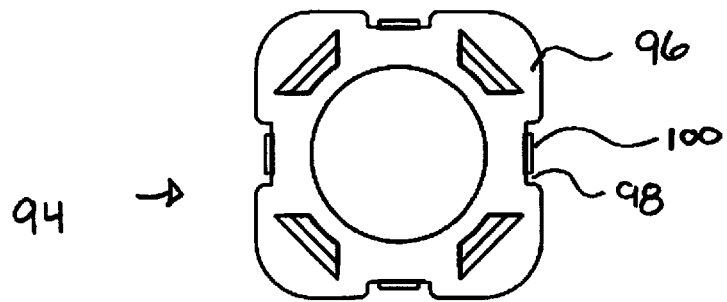
FIG. 34 is a top view of a post block.
Figure 35:
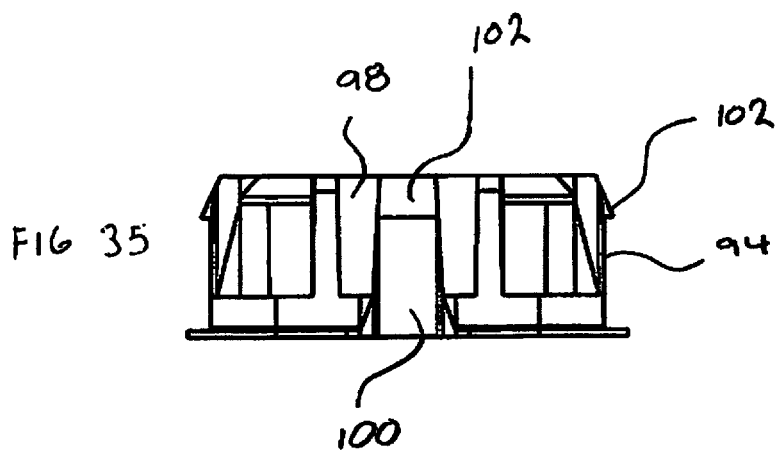
FIG. 35 is a side view of a post block.
Figure 36:
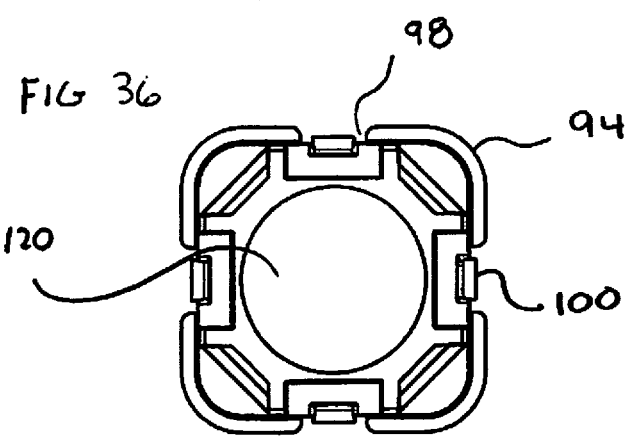
FIG. 36 is a bottom view of a post block.
Figure 37:
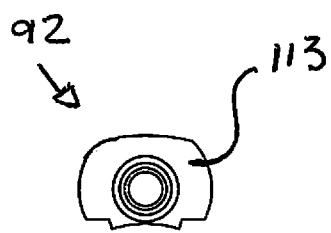
FIG. 37 is a top view of a threaded post.
Figure 40:
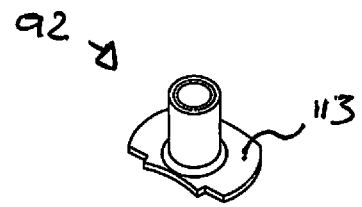
FIG. 40 is a perspective view of the threaded post.
Figure 38:
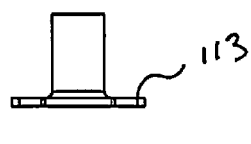
FIG. 38 is a side view of a threaded post.
Figure 39:
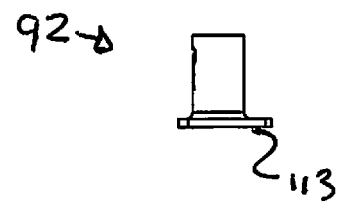
FIG. 39 is a side view of a threaded post rotated 90 degrees.
Figure 43:
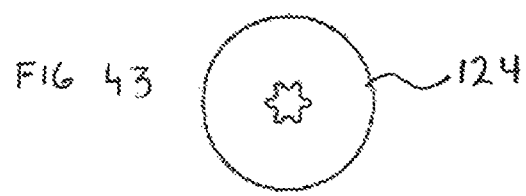
FIG. 43 is a top view of the bolt
Figure 42:
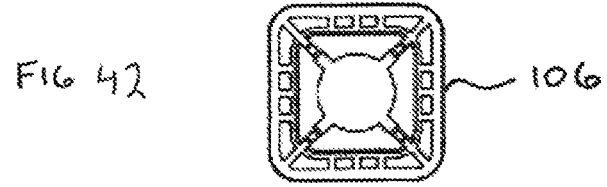
FIG. 42 is a bottom view of the spacer.
Figure 41:
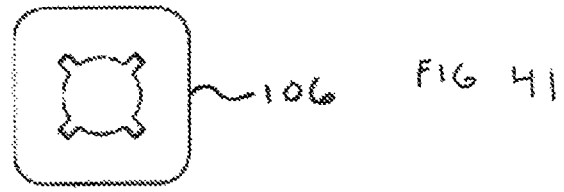
FIG. 41 is a top view of the spacer.
Figure 121:
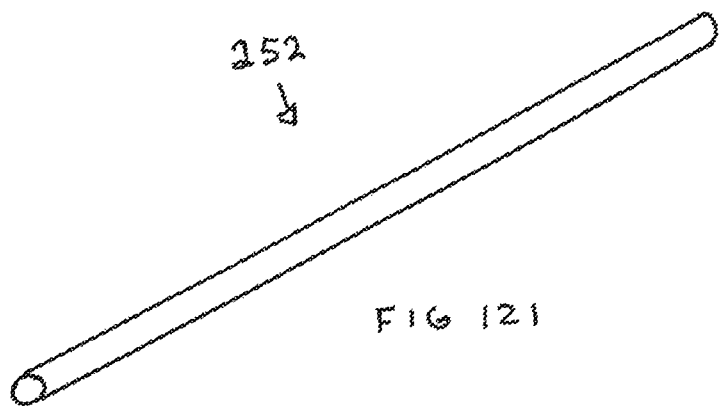
FIG. 121 is a side perspective view of a support rod.
Figure 125:
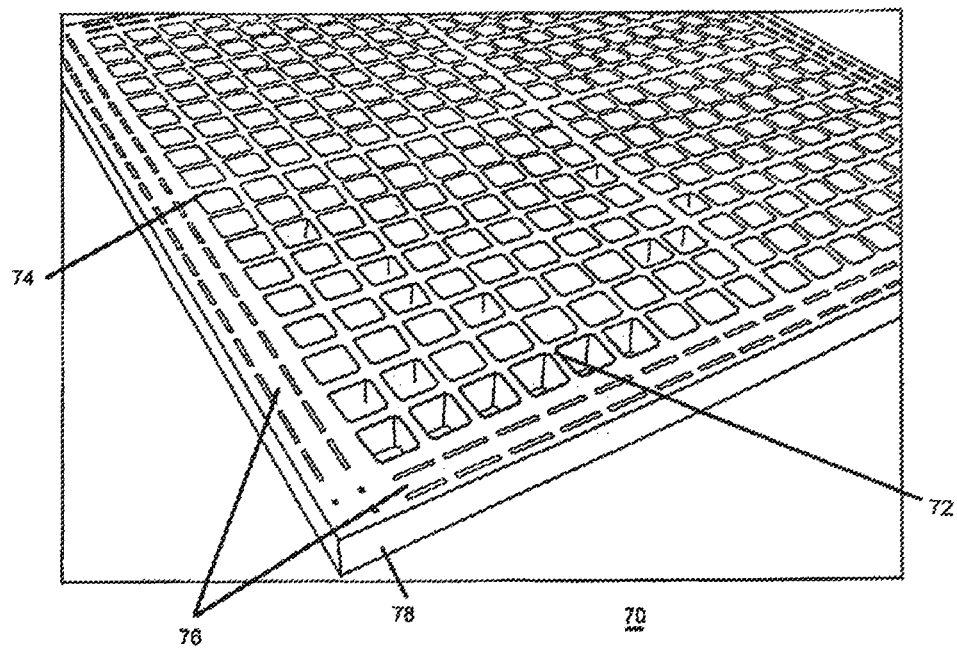
FIG. 125 is a top perspective view of a structural panel.
Figure 120:
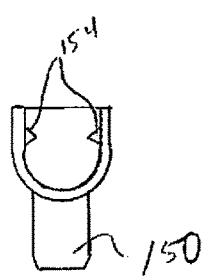
FIG. 120 is an end view of a support guide.
Figure 123:
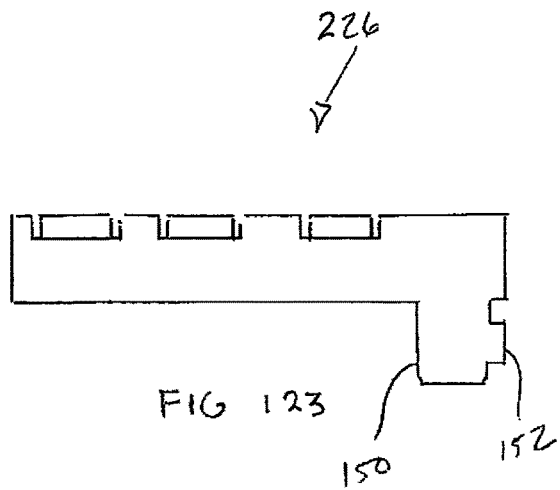
FIG. 123 is a side view of a support guide.
Figure 122:
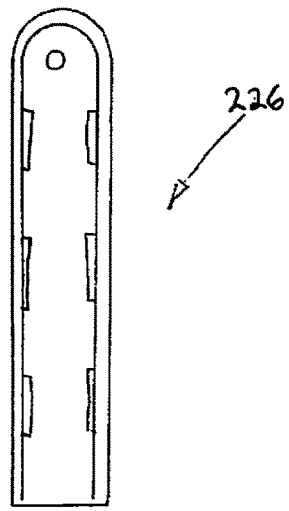
FIG. 122 is a bottom view of a support guide.

| ID | Name | Function | Positioned Above | Positioned Below |
|---|---|---|---|---|
| FIGS. 30-33 Element 121 | Post | Allow floating connecting of Reversible Panel to Base Mounting Plate | Base Mounting Plate | Post Block in Reversible Panel |
| FIGS. 34-36 Element 94 | Post Block | Centers post and threaded post in Reversible Panel to provide lateral stability | Reversible Panel and Post | Base Mounting Plate |
| FIGS. 37-40 Element 92 | Threaded Post | Provides post to bolt Reversible Panel to Base Mounting Block for high wind load lift | Base Mounting Plate | Reversible Panel |
| FIGS. 43-45 Element 104 | Bolt | Screws into Threaded Post | | |
| FIGS. 44, 45 Element 108 | Retrieval Spring | Provides upward force under Bolt | | |
| FIGS. 41, 42 Element 106 | Spacer | Ensures bolt fully contacts reversible panel bottom | | |
| Third Substrate Component Assembly | | | | |
| FIGS. 27-30 Element 4 | Base Mounting Plate (for pavers, lumber and frames) | final plate for the attachment of Paver Plates, brick posts, Reversible Structural Panels or Framing Braces (Structural lumber; | Stacker Plate, Top Stanchion Plate, Top Leveler Plate, or structural lumber w Framing Braces | Wedge Plate, or structural lumber w Framing Braces, Brick Posts, Reversible Structural Panel, Paver Plate |
| FIGS. 46-49 Element 2 | Shim Plate | Screws to deck planar surface and micro adjusts Stanchion Assembly | deck | Stanchion Bottom or Spacer Plate |
| FIGS. 113, 114, 116 Element 7 | Stanchion Assembly (made of top, stanchion and bottom) | Raises height of the Base Mounting Plate | Micro Adjust Plate, Stacker Plate, Leveler Top Plate or deck surface | Base Mounting Plate, Stacker Plate, or Leveler Bottom Plate |
| FIGS. 68-72 Element 116 | Stanchion Top Plate | Mounts to base mounting plate, spacer plate, leveler bottom plate | Stanchion | Base Mounting Plate, Stacker Plates, or Bottom Leveler Plate |
| FIGS. 113, 114, 116 Element 8 | Stanchion Post | Raise Height of either of the Mounting Plates | Stanchion Bottom | Stanchion Top |
| FIGS. 63-67 Element 110 | Stanchion Bottom Plate | Mounts to Micro Adjust Plate, or deck surface | Micro Adjust Plate, Stacker Plate, Anchor Plate, Leveler Top Plate | Stanchion |
| FIGS. 120, 122, 123 Element 226 | Support Guide | Holds ends of Support Rod | nothing | nothing |
| FIGS. 121 Element 252 | Support Rod | Connects adjacent stanchions | nothing | nothing |
| FIG. 118 Element 11 | Leveler Plate Assembly (made of Leveler top and leveler bottom) | Adjusts the angle of Base Mounting Plate or the Stanchion Assembly in one | Micro Adjust Plate, Stacker Plate, Stanchion Top Plate | Base Mounting Plate |
| FIGS. 83-87 Element 213 | Leveler Top Plate | or two planes | Leveler Bottom | Base Mounting Plate |

TABLE A-continued

COMPONENT CONNECTIVITY OF THE FLOORING
SUBSTRATE SUPPORT SYSTEM

Figure 50:
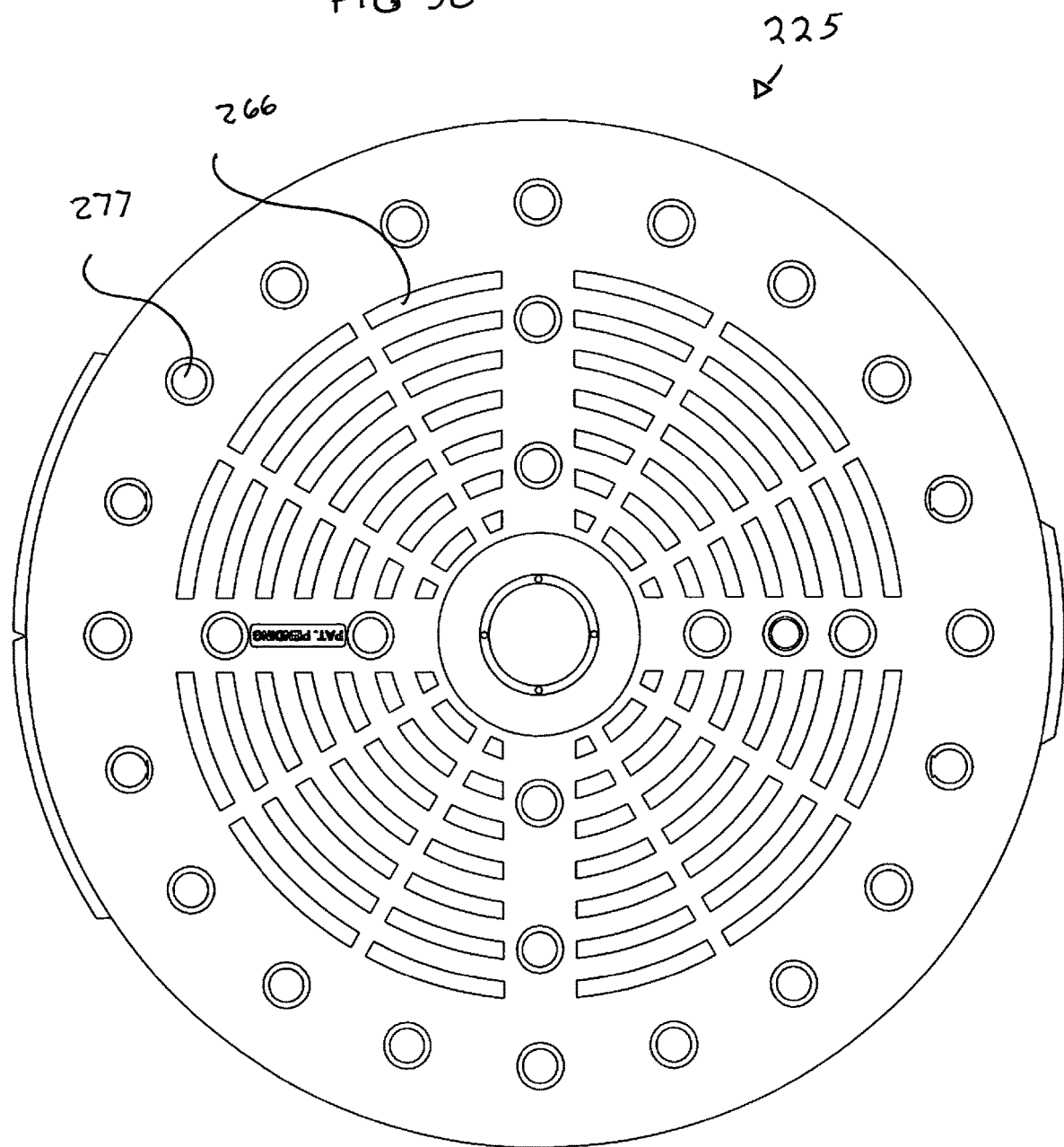
FIG. 50 is a top view of a wide base wedge plate.
Figure 51:
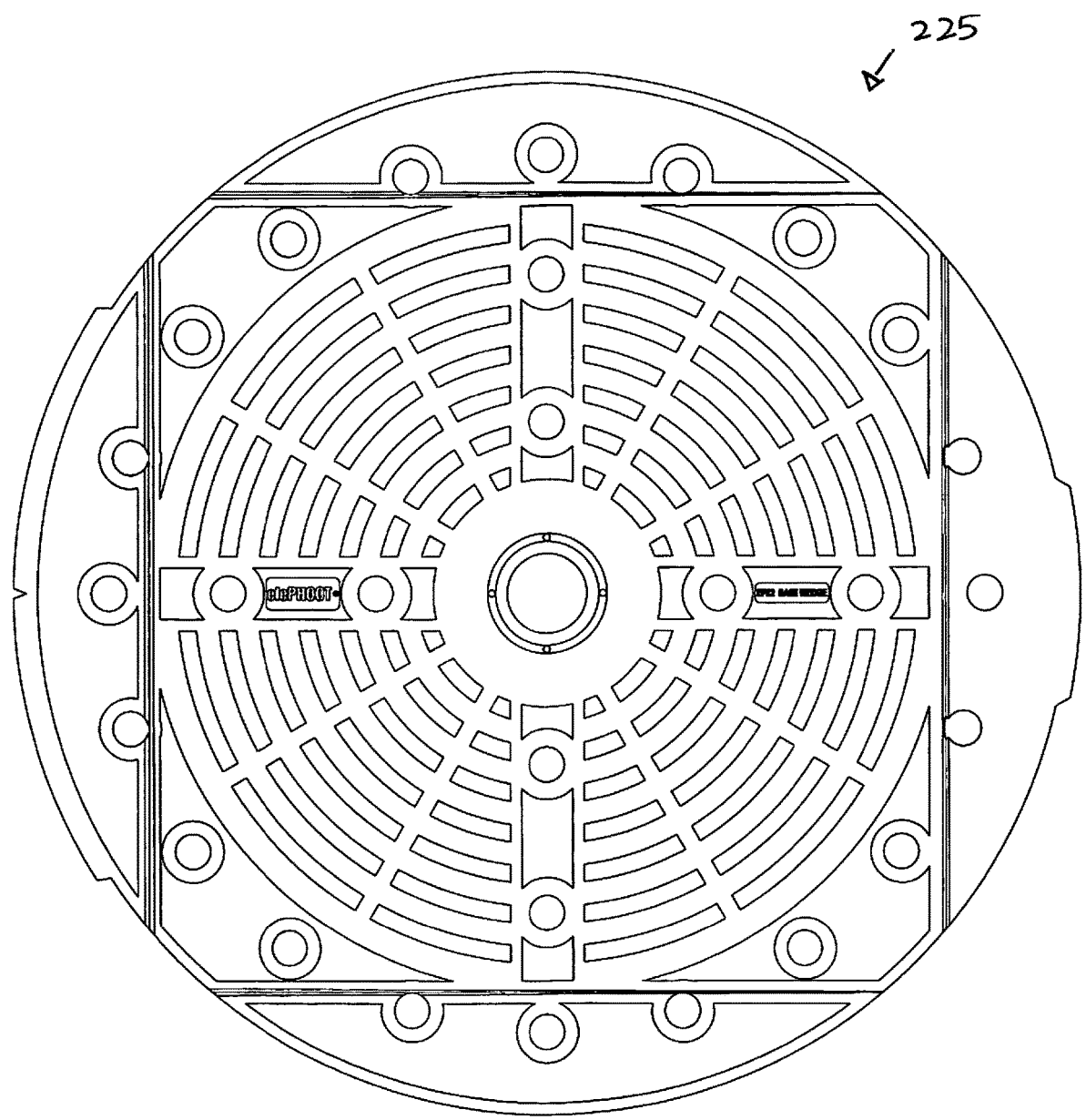
FIG. 51 is a bottom view of a wide base wedge plate.
Figure 52:
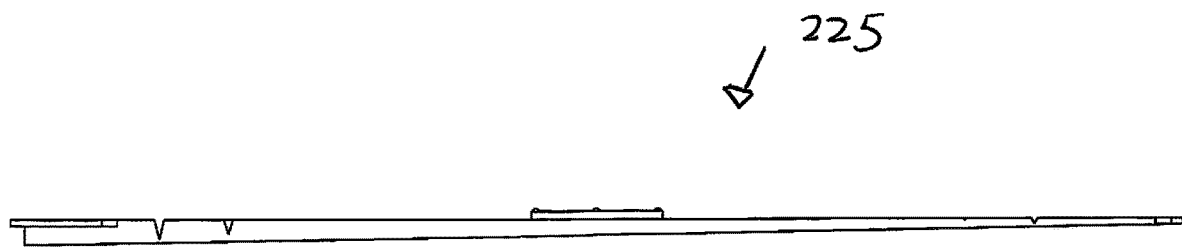
FIG. 52 is a side view of a wide base wedge plate.
Figure 54:
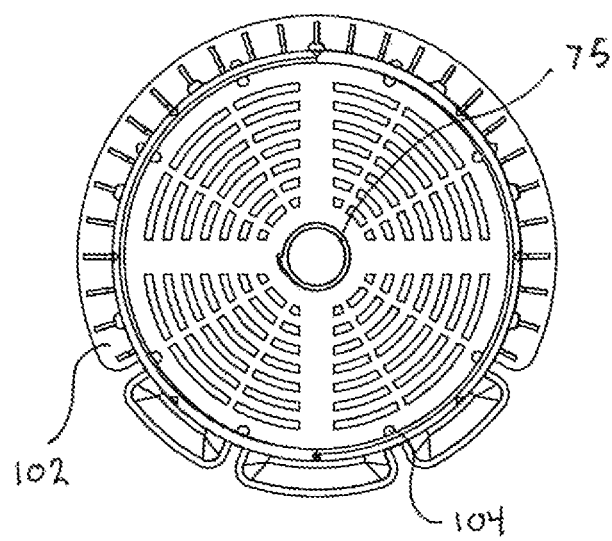
FIG. 54 is a top view of the wide base.
Figure 53:
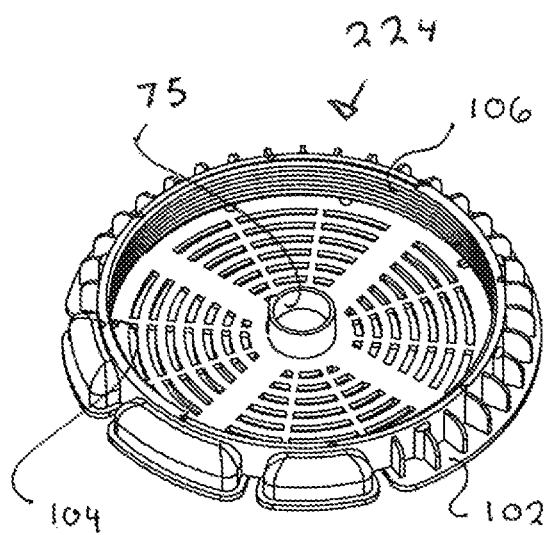
FIG. 53 is a perspective view of the wide base.
Figure 55:
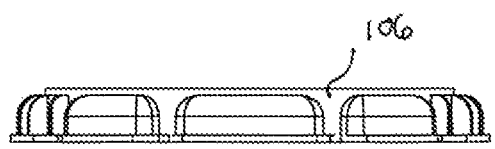
FIG. 55 is a side view of the wide base.
Figure 56:
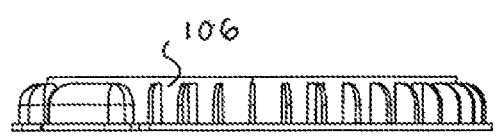
FIG. 56 is a side view of the wide base rotated 90 degrees.
Figure 57:
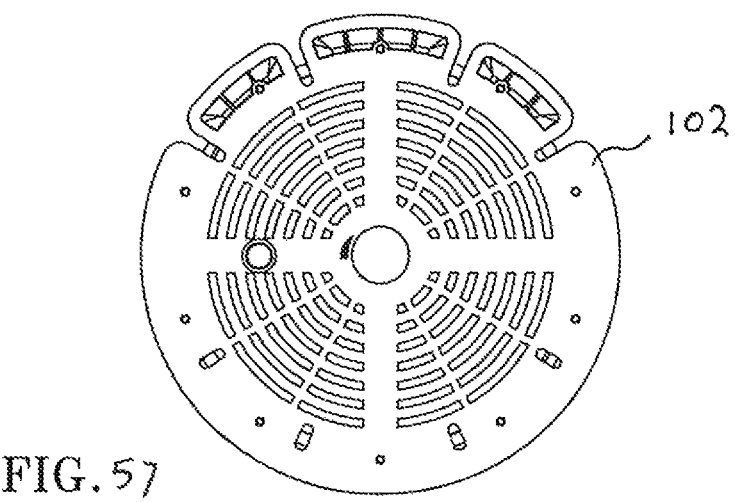
FIG. 57 is a bottom view of the wide base.
Figure 59:
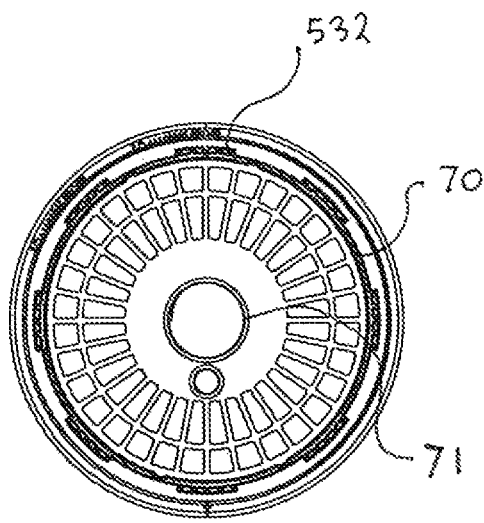
FIG. 59 is a top view of the micro adjust plate.
Figure 58:
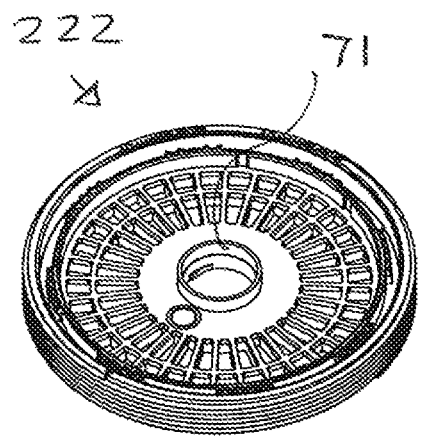
FIG. 58 is a perspective view of the micro adjust plate.
Figure 60:
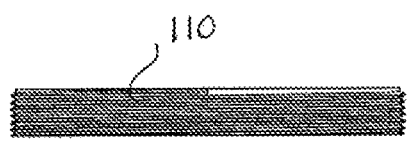
FIG. 60 is a side view of the micro adjust plate.
Figure 61:
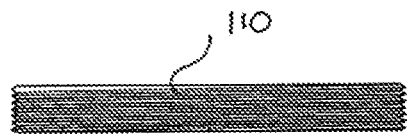
FIG. 61 is a side view of the micro adjust plate rotated 90 degrees.
Figure 62:
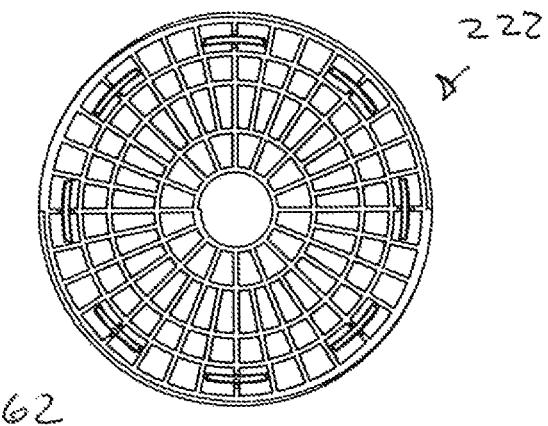
FIG. 62 is a bottom view of the micro adjust plate.
Figure 74:
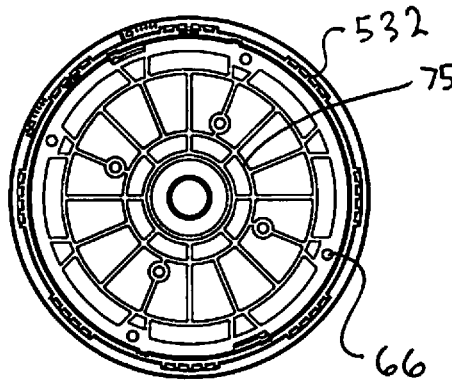
FIG. 74 is a top view of the stacker plate.
Figure 73:
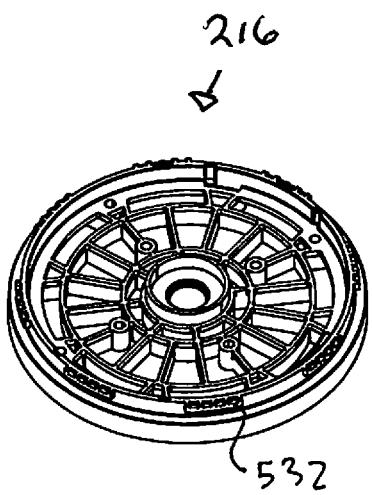
FIG. 73 is a perspective view of the stacker plate.
Figure 75:
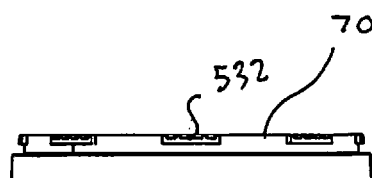
FIG. 75 is a side view of the stacker plate.
Figure 76:
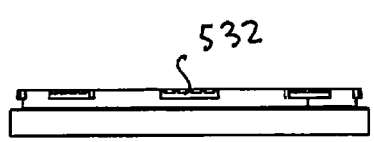
FIG. 76 is a side view of the stanchion stacker plate rotated 90 degrees.
Figure 77:
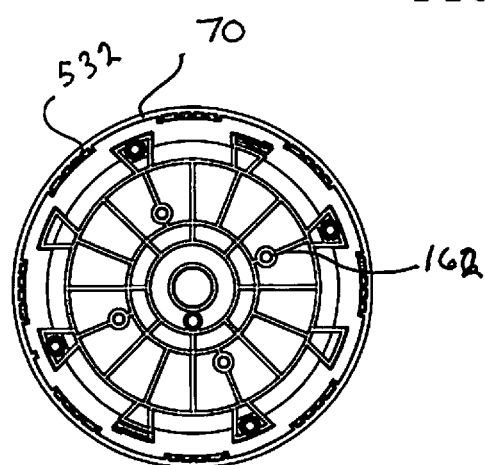
FIG. 77 is a bottom view of the stacker plate.
Figure 79:
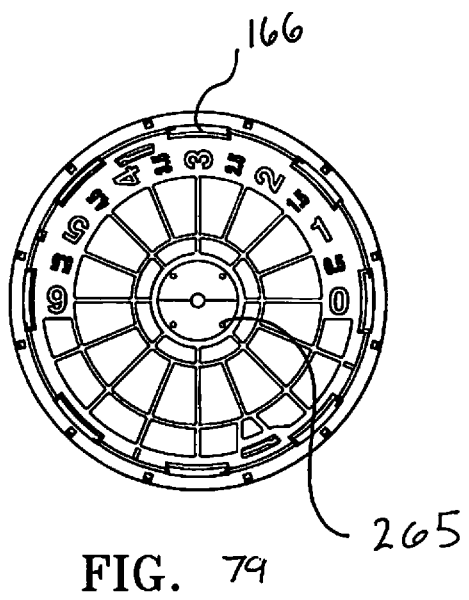
FIG. 79 is a top view of the leveler bottom plate.
Figure 78:
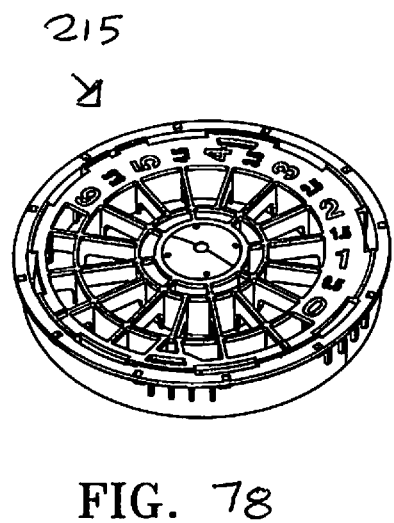
FIG. 78 is a perspective view of the leveler bottom plate.
Figure 80:
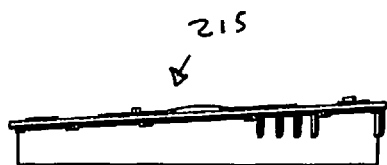
FIG. 80 is a side view of the leveler bottom plate.
Figure 81:
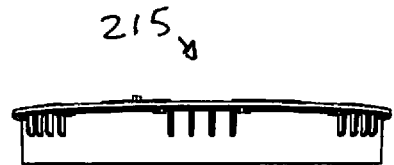
FIG. 81 is a side view of the leveler bottom plate rotated 90 degrees.
Figure 82:
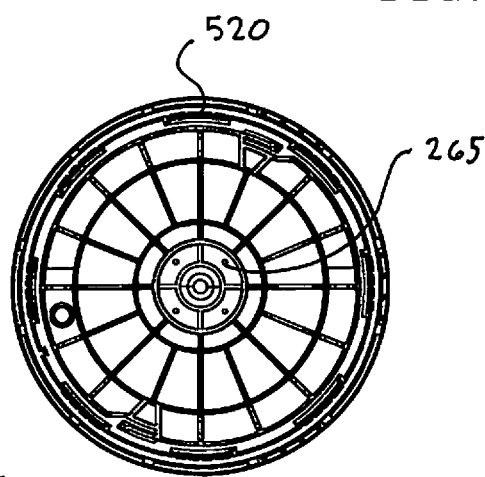
FIG. 82 is a bottom view of the leveler bottom plate.
Figure 84:
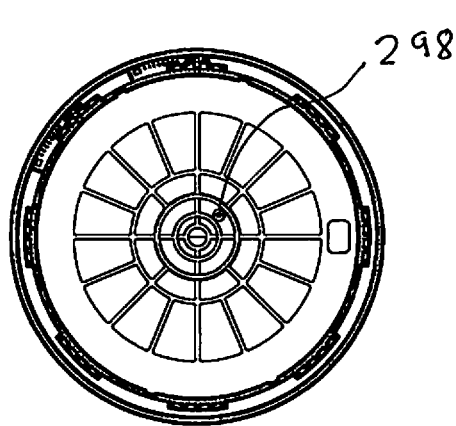
FIG. 84 is a top view of the leveler top plate.
Figure 83:
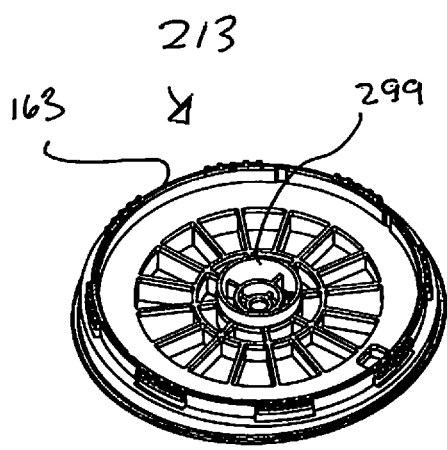
FIG. 83 is a perspective view of the leveler top plate.
Figure 85:
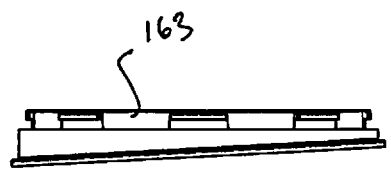
FIG. 85 is a side view of the leveler top plate.
Figure 86:
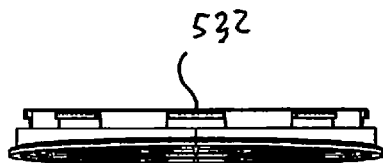
FIG. 86 is a side view of the leveler top plate rotated 90 degrees.
Figure 87:
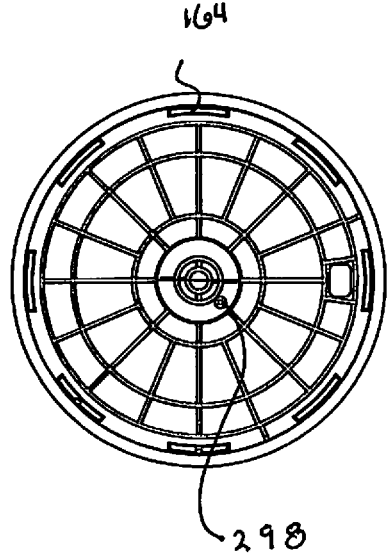
FIG. 87 is a bottom view of the leveler top plate.

| ID | Name | Function | Positioned Above | Positioned Below |
|---|---|---|---|---|
| FIGS. 78-82 Element 215 | Leveler Bottom Plate | | Micro Adjust Plate, Stacker Plate, Stanchion Top Plate | Leveler Top |
| FIGS. 97-99 Element 212 | Framing Braces | Allows for the connection to dimensional lumber | Base Mounting Plate | Base Mounting Plate |
| | Bugle Head Screw | Attaches Framing Braces | | |
| FIGS. 92-95 Element 114 | Paver Plate | Allows the paver stone corners to be supported | Base Mounting Plate or ½° Wedge Plates | nothing |
| FIGS. 73-77 Element 216 | Stacker Plates | Raises height in ½" increments | Deck Membrane, ½° Wedge Plates | Paver and Frame Mounting Plate, and Panel Mounting Plate |
| FIGS. 88-91 Element 218 | ½° Wedge Plate | Adjusts Stanchion Assembly height by a ½° difference | Top of Stanchion Assembly | Structural Panel, Paver Plate, Brick Post or Threaded Post |
| FIG. 111 Element 220 | Wide Base Assembly (made of micro adjust plate 22 and wide base 24) | Adjustably Supports Base Mounting Plate, Stacker Plates, Leveler Plates and Stanchion Bottom Plate | Deck Membrane | Base Mounting Plate, Stacker Plates, Leveler Plates and Stanchion Bottom Plate |
| FIGS. 58-62 Element 222 | Micro Adjust Plate | Variably adjusts the height of the Stanchion Assembly | Wide Base | Base Mounting Plate, Stacker Plates, Leveler Plates and Stanchion Bottom Plate |
| FIGS. 53-57 Element 224 | Wide Base | Supports Stanchion Assembly | Deck Membrane | Micro Adjust Plate |
| FIGS. 50-52 Element 225 | Wide Base Wedge Plate | Wide Base connects under Wide Base to micro level | Wide Base | Structure |
| FIGS. 100-103 Element 233 | Brick Post | Mounts to the Base Mounting Plate to secure brick sides | Base Mounting Plate | Brick |
| | Bubble Level | Sits in Base Mounting Plate, Leveler Top Plate or Stacker Plate | Nothing | Base Mounting Plate, Leveler Top Plate or Stacker Plate |

First Substrate Component Assembly

These embodiments of the flooring support system are designed for the direct glue adhesion of thin tiles or stones onto the top face of the structural panel 30. The individual flooring elements will overlap onto multiple structural panels 30 so as to make a unitary floor. There will be open spaces between adjacent flooring elements to account for drainage. The structural panel 30 will be mechanically or gravitationally affixed to the underlying deck. This embodiment is used on flat, generally horizontal decks only where no correction for slope or height is required.

In the mechanically attached embodiment, an offset panel retaining clip 32 is set into the structural panel 30 in any of the possible four 90 degree rotations and a bowl headed screw 34 angled to contact the underlying deck for direct screwed mechanical connection. Once screwed to the underlying deck, the floors are glued on the top face of the structural panel 30.

In the gravitationally stacked embodiment (that is used when there is to be no penetration of an underlying deck waterproof membrane) a pair of spring arms 42 are frictionally locked into a float plate 40 and the spring arms 42 are compressed slightly together as they are slid into an open cell of the structural panel 30 from the bottom face until they lock into the structural panel 30. The bottom face of the float plate 40 is placed upon the underlying deck membrane and the flooring is affixed on the structural panel 30.

In order to better understand the structure and function of the components in these two embodiments, their substrate component and system components are discussed in detail herein.

Structural Panel 30 (see FIGS. 2-5) is a planar, rectangular, polymer panel having a repeating array of four sided open cells 4. It is to be noted that this while open celled structural panel 30 retains much of the structure of the open celled structural panel disclosed in U.S. patent application Ser. No. 14/304,606, filed Jun. 13, 2014, entitled "Precision Height Adjustable Flooring Substrate Support System," it has some structural differences that allows for the use of the offset panel retaining clip 32.

These open cells 4 are generally square with four tapered, sloped internal sides 6. The top (longest) edge of the cell sides 12 lies along the top face 8 of the panel 30. The slope is inward toward the center of the cell 4 from their top edge to their bottom edge at approximately 2 degrees, with a minus 3 degree and plus 3 degree tolerance. The taper narrows the cell 4 from the top face 8 of the panel 30 to the bottom face of the panel 30, and enables the release of the structural panels 30 from their fabrication mold. The cells 4 are wider (the distance between opposing cell sides) than the depth of the structural panel 30. The bottom face of the panel is smooth, planar and unadorned. The top face of the panel 8 is also planar but has linear rabbets 10 cut partially along the inner side of the top edge of the cell sides 12. These rabbets 10 are located at the interfaces between the top of the cell sides 6 and the top face 8 of the panel 30. In the preferred embodiment, these rabbets 10 have an internal angle of approximately 90 degrees between their bottom and side faces. The rabbets 10 do not extend the entire length of the four edges 12 but are centered on the top edge of the cell sides 6.

Although referrer to as square, generally square, square configured or rectangular herein, the cell sides 6 of each open cell 4 do not necessarily meet adjacent cell sides at 90 degrees, rather, there may be an intermediate cell corner side. In the preferred embodiment this is a 45 degree chamfer wall 14 that extends the entire depth of the cell at all four of the corners between adjacent cell sides, although other configurations of this intermediate cell corner side.

The array of open cells in the structural panel 30 is spaced and sized for attachment to standard framing joists that are spaced 12", 16" or 24" on center. The panel's width designated by dimensional arrow 3 (FIG. 5) is 30" and its length designated by dimensional arrow 5 is 48". The structural panel 30 is designed to be able to be cut into smaller, working panels as necessary. There is a linear, cutable, length double cell wall row 49 and linear, cutable, width double cell wall rows 51 formed in the structural panel 30. These have linear series of through slots 57 that serve as cutting guides to scale down the structural panels into 16" along the width (designated by arrow 7) and into 24" along the length (designated by arrow 9). Each of these cut panels retain a full perimeter bar structure so as to meet USA dimensional building standards and accommodate commercially available flooring products.

Figure 4:
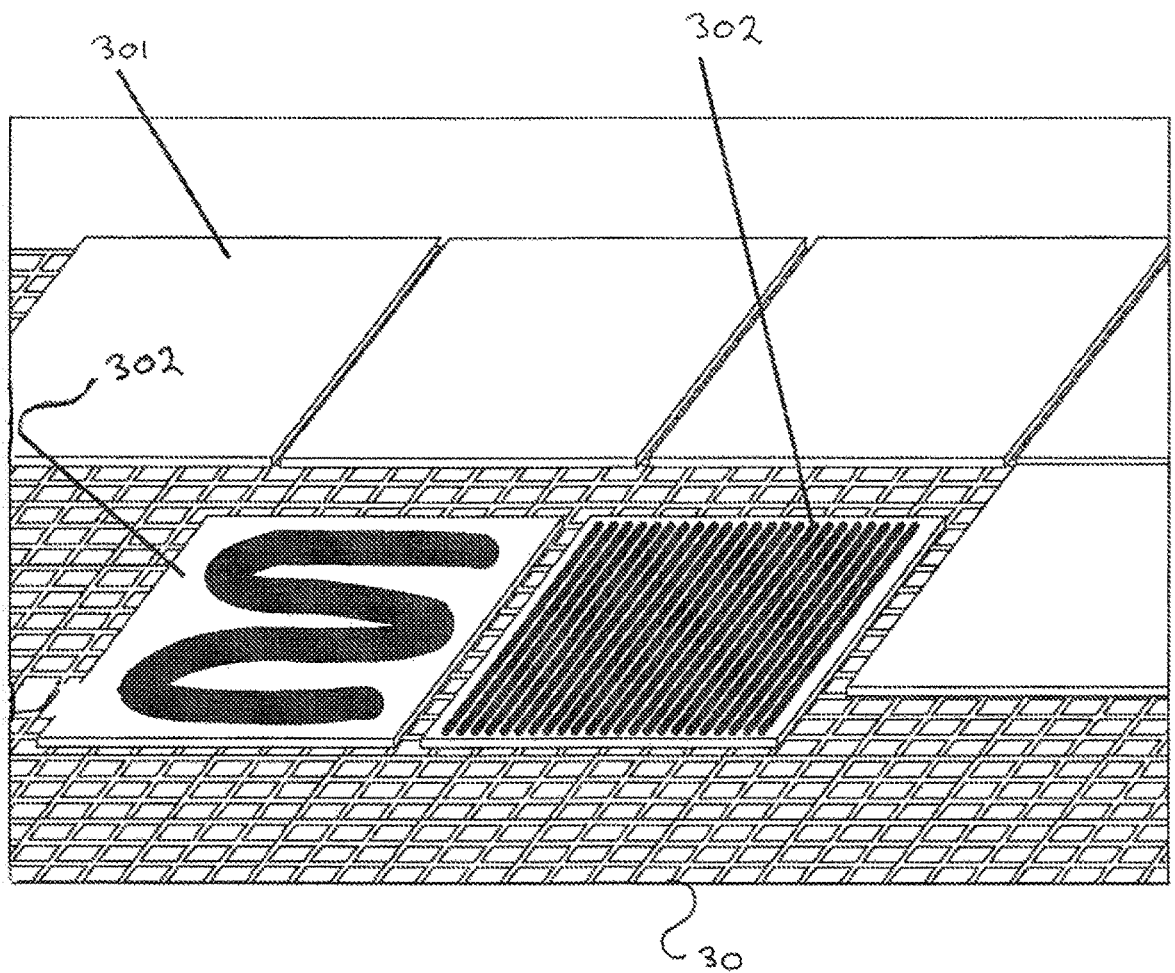
FIG. 4 is a view of tile being adhesively affixed to the top surface of a structural panel.
Figure 5:
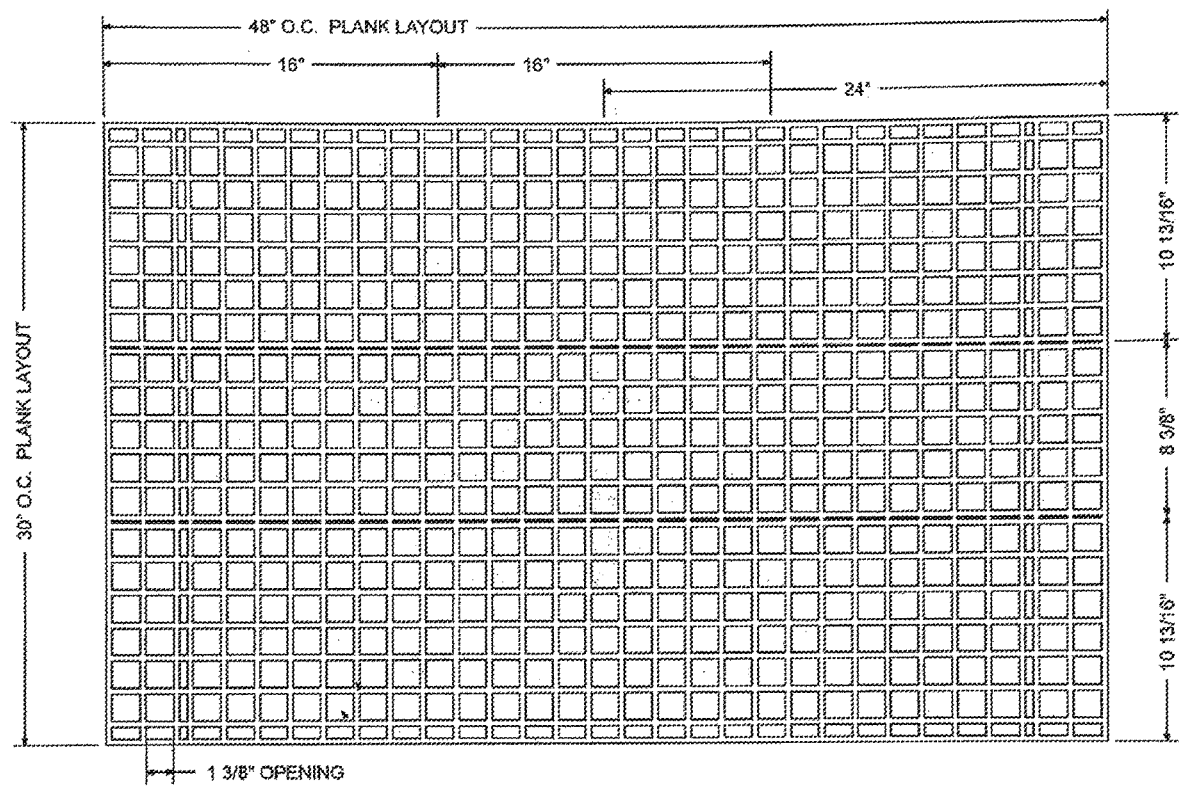
FIG. 5 is a top view of a complete structural panel.

FIG. 4 shows a structural panel 30 with tiles 301 affixed to the top planar surface of the structural panel 30 with an adhesive 302.

Figure 18:
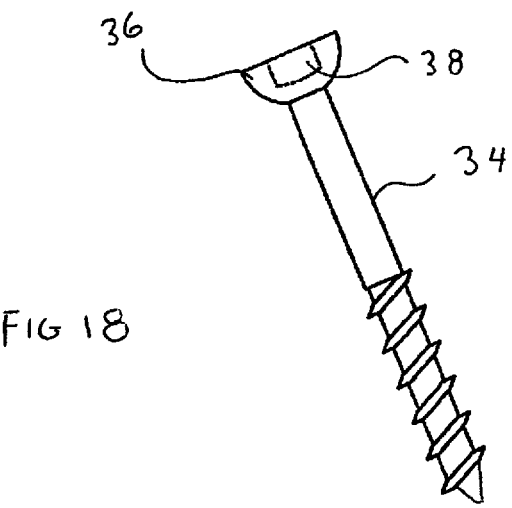
FIG. 18 is a bowl head screw.

Offset Panel Retaining Clip 32 (see FIGS. 15-17) is specifically configured for use with the open celled structural panel 30 and a bowl headed screw 34 (FIG. 18). This structural panel retaining clip 32 is a generally square extremely rigid disk, preferably made of steel, metal, or a polymer. The preferred embodiment is made from stainless steel to resist corrosion and oxidation. The clip 32 has small tabs 18 that extend from each of its four sides extending along the same plane of the clip's top face 20. The four tabs 18 do not run along the entire length of the sides, are matingly conformed to the rabbet 10, and are centered along the sides. The four corners of the clip 22 are bent away, downwards, (in a dog-eared fashion) from the plane of the top face 20 at an obtuse angle with respect to the bottom face of the clip 32. The tips of the four corners 22 of the clip 32 do not meet at a 90 degree apex but rather terminate in a 45 degree chamfer 26 (FIGS. 16 and 17) or optionally, the tips of the four corners terminate in a slight radius 28 (FIG. 15). This chamfer 26 or radius 28 is cut back far enough from the tips of the four corners 22 to reduce the length of the tips 22 so that the tips 22 clear the 45 degree chamfer wall 14 of the structural panel 30 that extends the entire depth at all four of the corners between adjacent cell sides when the clip 32 is inserted with its top face 20 parallel to the top face of the panel 8. However, when the clip 32 is inserted into the cell 4 such that the plane of its top face 20 is coplanar with the top face of the structural panel 8, the chamfer 26 on the tips 22 of the clip 16 frictionally engage the chamfer wall 14 contemporaneously with the seating of the four tabs 18 into the four rabbets 10. In this way, the clip 32 resides locked in its operational, horizontal configuration which is coplanaer with the plane of the top face of the structural panel 30.

In the clip 32 is a hemispherical indentation (bowl) 31 extending downward from the top face 20. The bowl 31 has a circular orifice 33 formed there through, matingly conformed to receive a bowl head screw 34 (FIG. 18). Since the clip 32 is square, it has two, identical longitudinal axes located 90 degrees apart. The bowl 31 is not located in the center of the clip 32. Rather, it is located centered about a point on one of the longitudinal axes of the clip 32, between two of the opposing clip sides. This longitudinal axis is shown as section line BB of FIG. 15. It does not lie anywhere along the other longitudinal axis of the clip 32 shown as line AA. It is to be noted that the diameter of the circular orifice 33 exceeds the diameter of the shaft of the bowl headed screw 34 by approximately 30%. This allows the bowl headed screw 34 to be used on an angle but limits the angle that the bowl headed screw 34 can be pivoted within the bowl 31 of the clip 32.

With this design, the tabs 18 of the structural panel retaining clip 32 may be orientated four different ways (via 90 degree rotations of the clip 32) in the rabbets 10. This allows the bowl headed screw 34 to be pivoted within the bowl 31 at an acute included angle with respect to the bottom face of the clip 32 greater than what would be possible if the bowl 31 and orifice 33 where centered in the clip 32. This way the bowl headed screw 34 will not contact the walls 6 of the cell 4 when it is used on an angle. This is important when the deck is open with exposed spaced framing members that are not perfectly aligned below the center of a cell 4 in a structural panel 30.

Bowl Head Screw 34 (see FIGS. 6, 18) is a screw, having screw threads about its shaft terminating at its distal end, and a hemispherical head 36 at its proximal end. (Although it is envisioned in specific situations a bolt rather than a screw thread may be employed on the mechanical fastener.) The driving recess 38 in the top face of the hemispherical head 36 may be configured to accept any of the known driver bits, be it Phillips, Robertson, slotted, hex, Torx or the like.

The bowl head screw 34 differs from a conventional bugle head screw because the bowl head screw 34 has a hemispherical drive head 36 at the proximal end of its threaded shaft. In comparison, bugle head screws, such as a drywall screw have heads with tapered, not curved, sides between the face of the head and the shaft. (Bugle headed screws will be used for all other screwing applications on the flooring support system components.) The bowel head screw 34 is matingly conformed to the bowl indentation in the panel screw clip 32. The preferred embodiment is made from stainless steel to resist corrosion and oxidation.

It is to be noted that the diameter of the circular orifice 33 exceeds the diameter of the shaft of the bowl headed screw 34. The outer diameter of the hemispherical drive head 36 is larger than the inner diameter of the circular orifice 32. By utilizing the mating hemispherical configurations of the bowl 31 and the drive head 36 in conjunction with the oversized orifice 33, the bowl headed screw 34 is free to pivot/swivel about 360 degrees in the bowl 31 within a limited angular range as illustrated in FIG. 6.

This angular range is dictated by the difference in size between the diameter of the bowl headed screw's shaft and the orifice 33 in the hemispherical bowl 31. Generally this is about 50 degrees. This ability for the bowl headed screw 34 to pivot/swivel within the clip 30 accomplishes two things. First, it allows the bowl head screw 34 to be pivoted to different vertical angles within the structural panel retaining clip 30 so as to allow connection to structural members beneath the structural panel that are not in complete vertical alignment with the orifice 33 in the panel screw clip 30, as previously discussed. Second, it allows for complete mating engagement between the curved hemispherical surfaces of the hemispherical body drive head 36 and the inner surface of the bowl 31 of the panel retaining clip 32. (Complete mating engagement is defined herein as having at least 80 percent of the curved surfaces of the hemispherical body drive head 36 in contact with the top face of the panel retaining clip 30.) This is attainable even at angles of 25 degrees from vertical. This complete mating engagement spreads out the contact forces between the head of the bowl headed screw and the retaining clip 32, about the entire surface of the bowl 31 and prevents tear through of the bowl headed screw 34 under high tensile load conditions. In the preferred embodiment, since the intended use for the structural panel 30 is outdoors, stainless steel is the preferred material of construction for the bowl headed screw 34 and the clip 32.

When the offset structural panel retaining clip 32 is put into the structural panel 30 the rabbets 10 along with the dog-eared corners of the offset panel retaining clip 32 help locate and stabilize the panel retaining clip 32 parallel to the top face of the panel 30 while the bowl head screw 34 is inserted and angled to locate a securement point on the underlying deck that it can secure the panel 30 to. In use, the retaining clip 32 with its installed bowl headed screw 34 will rest in its final position no higher than flush with the top face 8 of the structural panel 30 such that no machining is required to place a finished stone, tile, concrete surface directly over the structural panel 30.

When the structural panel 30 is mechanically affixed to the underlying deck, thin flooring (preferably tile or stone) is glued to the planar top face of the panel. Some of the individual flooring elements will span across adjacent structural panels 30 so as to lock the panels together and make a unitary floor. The panel sides and the sides of adjacent flooring elements will have a water drainage space as no grout is to be used between the individual flooring elements. The bonding of the finished stone, tile, concrete pavers or the like to the open celled structural plastic panel is accomplished using a flexible adhesive without any cement based bonding or bedding materials.

The non-mechanical attachment of the first substrate component uses a float assembly which is a float plate 40 with a pair of spring arms 42 and an optional adhesive friction pad to form a floating structural panel assembly that resides gravitationally on a waterproof membrane deck. This type of installation does not require any penetrations through the waterproof membrane, and allows the structural panels to float above the deck or roof between ¼ and ⅜ of an inch. The substantial weight of the panels and the applied flooring materials anchor the floor to the deck or roof.

Float Plate 40 (see FIGS. 19-21) is a planar, circular polymer disk 40 designed to retain a pair of substantially identical spring arms 42 normally therefrom, that interlock into the rabbets 10 of the structural panel 30. It has several (five illustrated) cutouts there through which the adhesive friction disk 41 that is adhesively affixed on the bottom face of the float plate 40 can be seen.

The float plate 40 has an angled Tee socket 50 formed on its top face 46 that runs the full depth of the float plate 40 down to the bottom planar face 48, and matingly engages the Tee tab configuration found on the bottom end of the spring arms 42. The Tee socket 50 is not smooth, but rather has small ribs 43 formed on its inside wall so as to aid in the frictional retention of the spring arms 42. The Tee socket 50 resides perpendicular to the float plate's top and bottom faces so as to reside vertical when the float plate 40 is placed on the deck. The Tee socket 50 has two opposing tapered grooves 52 formed down its depth that each terminate in an orifice extending perpendicularly from the tapered grooves 52 out the small sides of the Tee socket 40. There are strengthening ribs running throughout the float plate's body atop the upper face of the bottom face 48. The bottom face of the float plate 48 is planar and unadorned.

Spring Arms 42 (FIGS. 23-24) have a non-planar body 54 with a lip 56 extending perpendicularly from the proximal edge of their upper end. At the distal end of the body is an obtuse angled "Tee tab" 60. The Tee tab 60 has a central ridge 62 extending along its depth that engages in the short leg of the Tee socket 50. There are also two locking tabs 64 that extend from the sides of the Tee tab that are engageable in the orifices at the bottom of the opposing tapered grooves 52 in Tee socket 50 to lock the spring arms 42 to the float plate 40. The spring arm body 54 has a set of stabilizing legs 58 that reside on the top of the Tee socket 50 to broaden the profile of the arms 42 and prevent their lateral movement under load. Looking closely at FIG. 24 it can be seen that the body of the spring arms 54 is not coplanar with the Tee socket 50 but rather there is a slight angle from planar formed where the Tee socket 50 meets the spring arm body 54. This angle allows the pair of spring arms 42 to extend with a slight "Vee" configuration between them so that there is a greater distance between the tops of the spring arms 42 than at the bottoms of the spring arms 42. The distance between the lips 56 at the distal end of the spring arms exceeds the distance between opposing cell sides 6.

Figure 26:
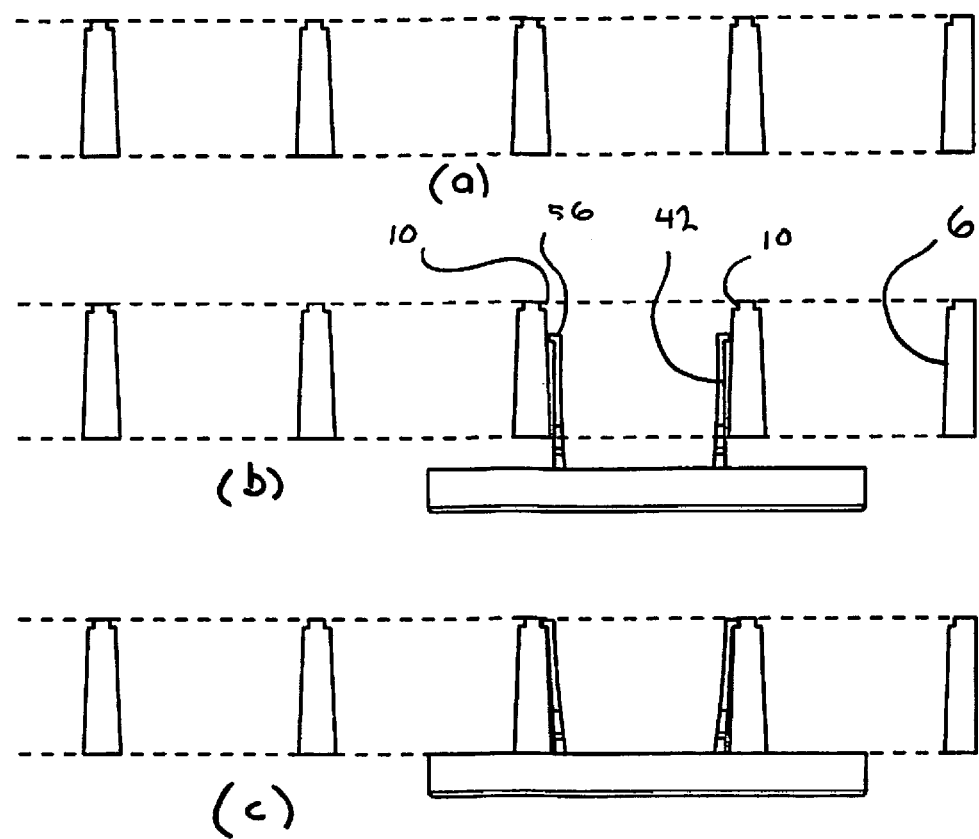
FIG. 26 (a)-(c) are sequential side views of the mounting of a structural panel on a float plate.
Figure 27:
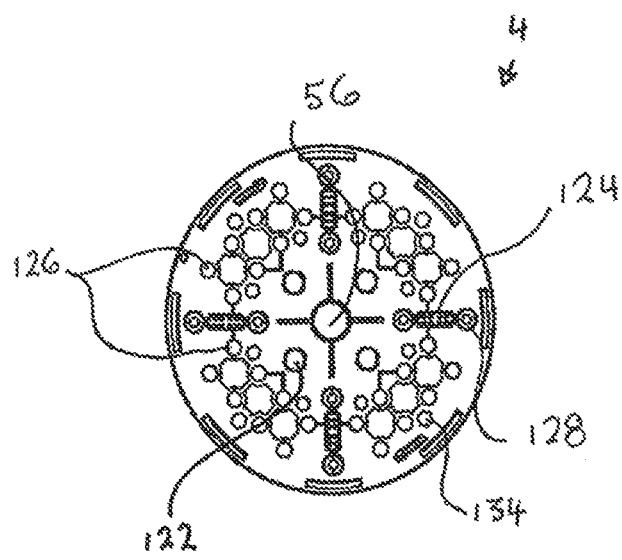
FIG. 27 is a top view of a base mounting panel.
Figure 29:
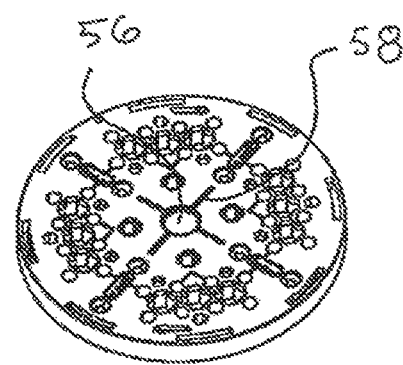
FIG. 29 is a perspective view of a base mounting panel.
Figure 124:
FIG. 124 is a side view of a base mounting panel.

In installation, (FIG. 26 (a)-(c)) the pair of spring arms 42 are compressed toward each other when inserted into an open cell. The lips 56 frictionally slide along the cell sides 6 until the lips 56 reach the rabbets 10 where the spring arms tension forces the lips 56 into the rabbets 10 where they lock the panel and the spacer plate together.

Adhesive Friction Disk 41 (FIGS. 19, 24, 25) is a polymer disk slightly larger in diameter than the float plate, with adhesive tape on one face that may be affixed to the bottom face of the float plate 40 to reduce point loading and increase frictional resistance to lateral movement of the float plate 40 on the deck. It has a matte finish on its non-adhesive face. It also provides micro height adjustment above the waterproofing in the event that the waterproofing has small bumps or deformations.

The combination of the structural panel 30, float plate 40 and spring arms 42 form an interlocking plate that engages the bottom of a structural panel to allow the structural panel to float over a deck to allow moisture to pass under the structural panel. With the interlocking feature available in any cell of the structural panel float plates may be positioned anywhere underneath any dimensioned the structural panel as required for proper function and support.

Second Substrate Component Assembly

The embodiments of the second substrate flooring support system are designed for the direct glue adhesion of thin tiles or stones onto the top face of the reversible structural panel similar to that of the first substrate component assembly, except this substrate component assembly is designed to be used where correction for the slope and height of the underlying deck is required, and where compensation for high wind lift forces is needed. It may be directly connected to the deck with its own design retaining clip and bowl headed screw or to accommodate the above corrections, it may be reversed and connected to the third substrate component assembly, or again, directly connected to the deck with its own design retaining clip and bowl headed screw.

In order to better understand the structure and function of the components in these three embodiments, their substrate components and system components are discussed in detail herein.

Reversible Structural Panel 60 (see FIGS. 7-10 and 125) is provided in polymer sheets having a repeating pattern of rectangular 1.5 inch deep, and 1.5 inch wide open cells 62 formed therein. The individual cells may have parallel or tapered side walls 64 such that they are wider at the cell top than at the cell bottom. The top face 68 and the bottom face 74 are not identical. The top face 68 has top openings 66 that begin at the top edge 66 of the side walls of the cell 64. The bottom face 74 has much smaller bottom openings 71 as there is an internal cell flange 70 extending inward from the bottom of all four cell side walls 64. There are cutting slots 72 between all parallel sides of all adjacent cells. This uniformity makes it possible to remove a fixed dimensional increment in each structural panel direction so as to change the panels outside dimensions without loss of physical integrity.

A fiber reinforced general purpose polyester molded resin panel is preferred, although other materials may be used. The reversible structural panel size is preferably 4 foot by 4 foot, based on construction standards and practices, but may be otherwise re-sized to desired dimensions by cutting between the cutting slots 72 so as to provide a system that functions with 16 inch and 24 inch framing dimensions typically used in deck applications. Note, however the 48"×48" square dimension meets the standard USA building dimension layout. The panel can be provided in other sizes than the illustrated example, chosen to have sufficient support while spanning the supporting elements supporting the panel. Preferably the panel is a pre-configured dimensional size suitable for compliance with customary building practices.

Reversible Panel Retaining Clip 76 (see FIGS. 6, 11, 12) is made of a stainless steel material, stamped into a rectangular (preferably square) shape. There is a central bowl indentation 78 formed that has a central orifice 80 there through. The design of this is identical to that of the hemispherical bowl 31 and orifice 33 in the structural panel retaining clip 32. The largest diameter of the central orifice is smaller than the openings in the bottom face 74 of the reversible structural panel 60 so that the reversible panel retaining clip 76 will lie flat on the internal cell flange 70 when placed inside the cell 62.

The mechanical fastener used to secure this panel to the deck is again a bowl headed screw 34. Stainless steel is the material of construction for the preferred embodiment.

When used in the standard configuration (FIG. 14) the reversible panel retaining clip 76 is placed at the bottom of the appropriate cell 62 so as to rest on the internal cell flange 70 and the bowl headed screw 34 placed through the central orifice 33, angled for good contact with the underlying deck, and then screwed in. This leaves a planar top substrate ready for flooring. The retaining clip 76 with the installed bolt will rest in its final position no higher than flush with the top of the reversible structural panel 60 such that no machining is required to place a finished stone, tile, concrete surface directly over the reversible structural panel 60. Prior art panels utilize connectors that span more than one of their open cells leaving a protuberance above the plane of the panel proper.

When used in the reversed configuration, (FIG. 13) the reversible panel is flipped so the bottom face of the panel 74 faces upward and the retaining clip 76 is placed on the bottom face of the panel 74 with the bowl head screw 34 again placed through the central orifice 33, angled for good contact with the underlying deck, and then screwed in. This embodiment leaves the thickness of the reversible panel retaining clip 76 above the planar bottom face of the reversible panel. The flooring to be placed on top of this substrate component will not be rigid but rather will be soft such as turf or rubber.

The reversible structural panel is suited to be mounted either directly atop a level planar deck or atop the base mounting plate 4. The base mounting plate 4 must be used in the majority of situations where leveling and height adjustment is necessary. The structural panel 30 can be affixed to the base mounting plate 4 in two different ways depending whether mechanical attachment or gravitational attachment is desired. If the reversible structural 60 panel is not to be mechanically attached to the base mounting plate 4 but rather just laterally supported, so the panel may float freely, then the post 121 and post block 94 are used. If the reversible structural 60 panel is to be mechanically attached to the base mounting plate 4 for rigid attachment to the deck (to compensate for high wind lift forces) then the threaded post 92, bolt 104, retrieval spring 108 and spacer 106 are used. With this configuration, a base mounting plate 4 can constrain the corners of four reversible structural panels 60.

The base mounting plate 4 will be described more fully herein, as it is the substrate component itself of the third substrate component assembly, but is also a component of the second substrate component assembly residing directly beneath the reversible structural support panel 60.

Base Mounting Plate 4 (see FIGS. 27-30) is the substrate component lying between the underlying deck and any intervening combination of leveling or height changing elements that supports the flooring. There is only one top member of any stacked array of precision height and slope adjustable components. This is the base mounting plate 4. This base mounting plate 4 also serves to support the substrate component reversible structural panel 60. Thus it may be a substrate component or a component. Below the base mounting plate may reside adjacent to the framing braces 212, the leveler top plate 213, the micro adjust plate 222 (of the wide base assembly), the stacker plate 216, the stanchion top plate 116, the anchor plate 2 or a wedge plate 218. Above the base mounting plate 4 may be the post 121, the threaded post 92, the brick post 233, a transit card, a circular bubble level or the paver plate 114.

The base mounting plate 4 is a cylindrical disk that has a planar top face 3 with a first set of cylindrical lock orifices 122 for the top mating engagement and twist locking of detachable post 121 (FIGS. 30-33) therethrough. The cylindrical post 121 has a series of four radial tabs 123 extending normally from its exterior face, and the mounting plate 4 has a series of four radial slots formed at its top face, adjacent to a top end of said lock orifices 122 that are matingly conformed to accept the radial tabs 123 for insertion of the post 121 and that allow the locking rotation of the post onto the base mounting plate 4. (twist locking) There is a hex slot 127 formed along the linear axis of the post 121 that begins at the top end of the post 121 that accepts any of a standard, SAE or metric sized hex wrench, so as to enable the locking or removal of the post 121 from the base mounting plate 4 from the top of a cell.

Figure 28:
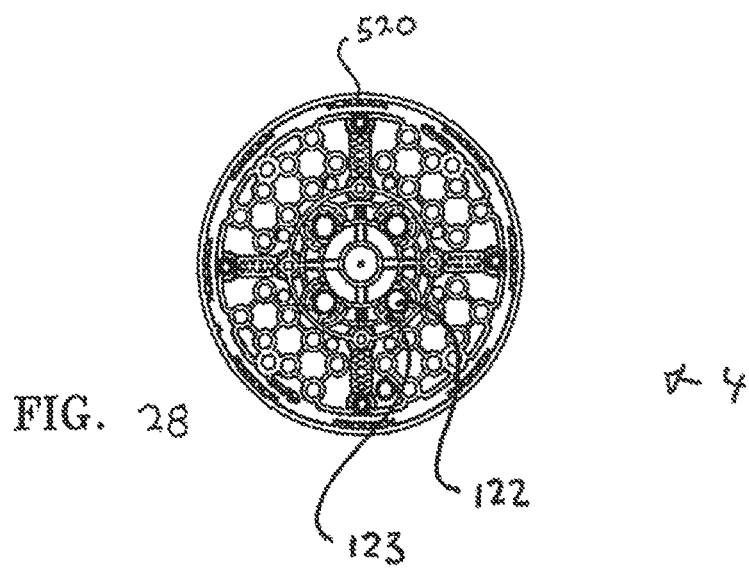
FIG. 28 is a bottom view of a base mounting panel.
Figure 33:
FIG. 33 is a top view of a post.
Figure 30:
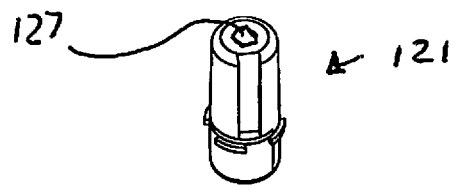
FIG. 30 is a perspective view of a post.
Figure 32:
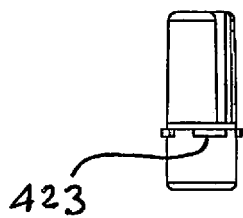
FIG. 32 is a side view of a post rotated 90 degrees.
Figure 31:
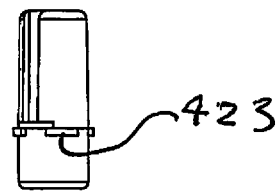
FIG. 31 is side view of a post.

Looking at FIG. 28, the bottom face of the base mounting plate 4, it can be seen that around the lock orifices 122 is a shaped recess 123 formed thereon that matches the locking foot 113 on the threaded post 125 (FIGS. 37-40). This allows for the bottom insertion of the threaded post 92 through the lock orifices 122 so as to extend perpendicularly from the top face of the base mounting plate 4 and be constrained from rotation.

Also, on the bottom face of the base mounting plate 4 is a set of evenly radially spaced, tabs that form a ring of inward facing teeth (IFT) 520. These teeth project inward from the outer periphery of the base mounting plate 4. The radial spacing between tabs is greater than the length of the tabs. This design provides the interlocking engagement between various components of the flooring support system that have a set of matingly sized and conformed outward facing teeth (OFT) about the perimeter of their top faces. It allows a plunge to mate the components with the IFT and the OFT then twist to lock them together. The IFT have a slot with an end tab that retains the OFT when the components are brought together and twisted to lock. This "plunge and twist" style of interlocking allows different combinations of the various system components to achieve the proper height, deck angle correction and deck connectivity to make a unitary rigid support structure for a structural panel or reversible structural panel.

The base mounting plate 4 has a set of four rectangular slots 124 for engagement with the legs 135 on brick posts 233 (FIGS. 100-103) which will extend above the top face of the base mounting plate 4 to align the sides of pavers placed thereon. These slots have protrusions that extend perpendicularly from some of the sides of the rectangular slots to engage the legs 135 of the brick posts 233. The rectangular orifices number four and are arranged radially from the midpoint of the base mounting plate so as to reside perpendicular to all adjacent rectangular orifices.

The base mounting plate 4 also has a series of bugle head screw orifices 128 to facilitate the direct screwing of the base mounting plate 4 to the deck with bugle headed screws. These bugle head screw orifices 12 have a depth that extends between the top face and the bottom face, with an inwardly tapered side wall extending from said top face partially along said depth.

Figure 97:
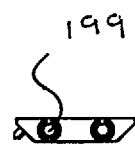
FIG. 97 is a top view of the framing brace.
Figure 96:
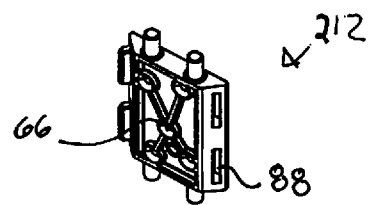
FIG. 96 is a perspective view of the framing brace.
Figure 98:
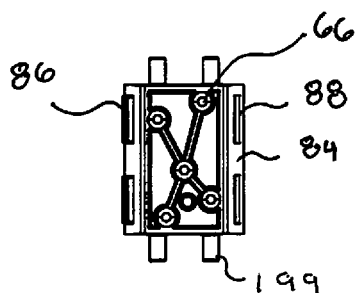
FIG. 98 is a front view of a framing brace.
Figure 99:
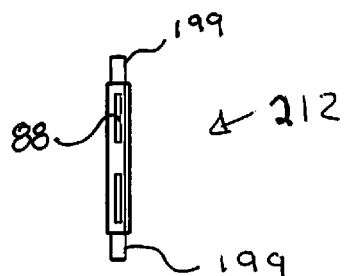
FIG. 99 is a side view of a framing brace.
Figure 101:
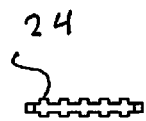
FIG. 101 is a top view of a brick post.
Figure 100:
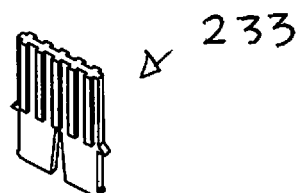
FIG. 100 is a perspective view of the brick post.
Figure 102:
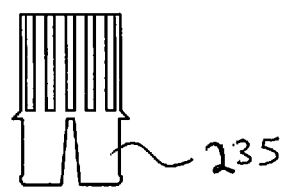
FIG. 102 is a front view of a brick post.
Figure 103:
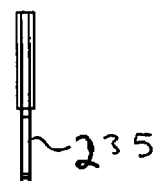
FIG. 103 is a side view of a brick post.
Figure 104:
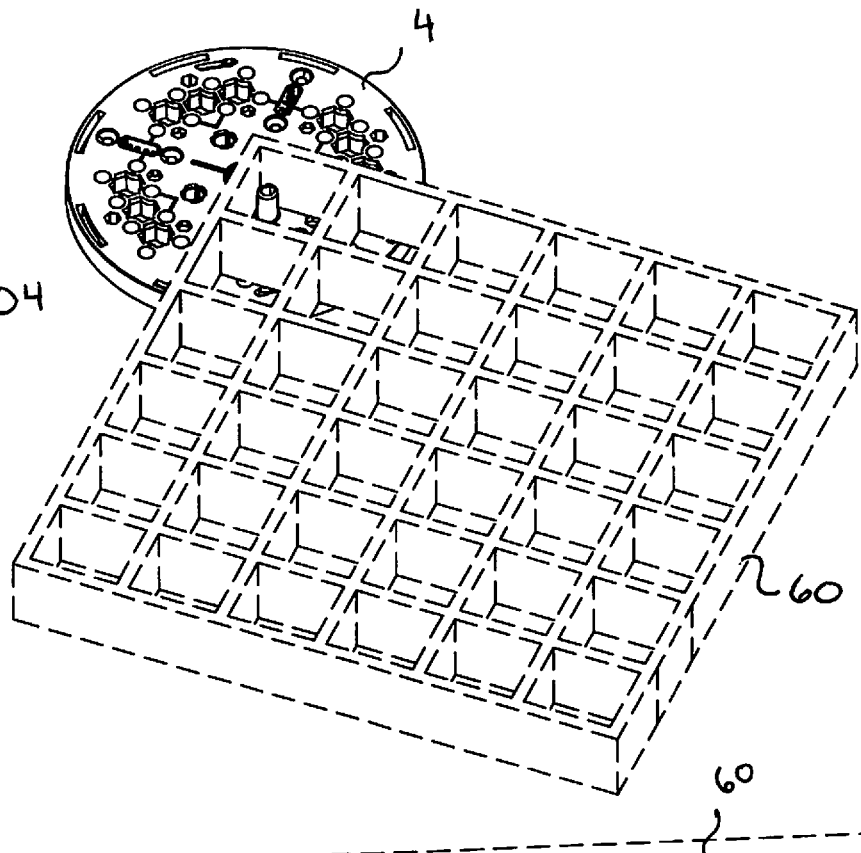
FIG. 104 is a top perspective view of a reversible structural panel gravitationally connected atop a base mounting plate.
Figure 105:
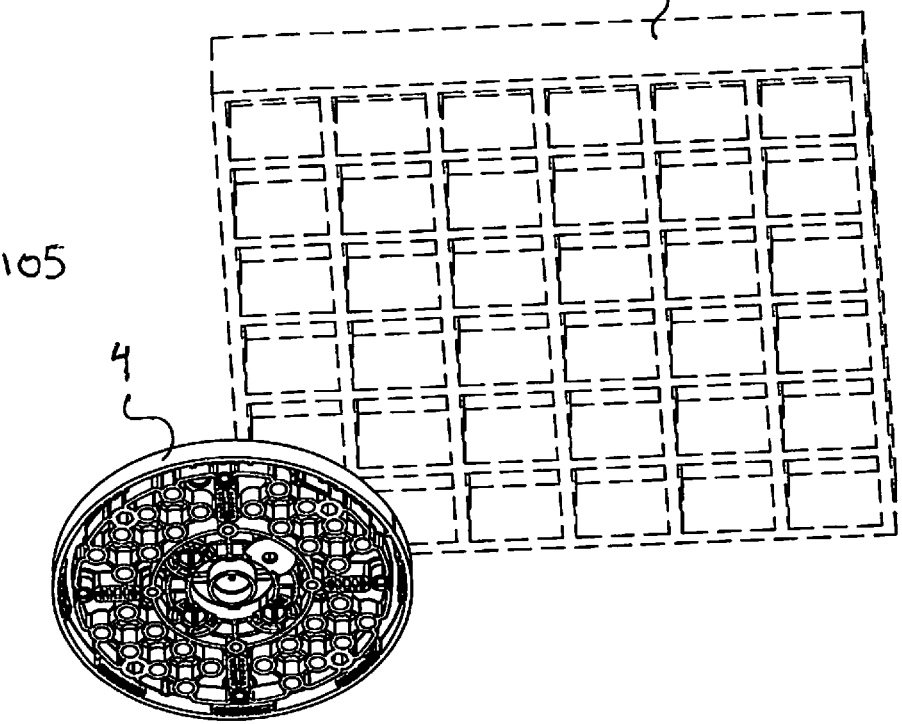
FIG. 105 is a bottom perspective view of a reversible structural panel gravitationally connected atop a base mounting plate.

To allow the base mounting plate 4 to be attached to wooden structural members the base mounting plate 4 also has sets of grouped orifices 126 for the engagement of the pins 199 that extend normally from the framing braces 212 (FIGS. 96-98). There are four sets of grouped orifices each having eight orifices arranged in two parallel rows of four orifices. These orifices extend between said top face and said bottom face, and are adapted to receive a pair of pins extending from either end of a dimensional lumber bracket.

These groupings allow for the connection of multiple framing braces and at various angles to accommodate different structural lumber arrangements. Since these sets of grouped orifices 126 are through orifices, the posts at either end of the framing braces 212 can be placed on the top or bottom face of the base mounting plate 4.

To allow the base mounting plate 4 to secure a triangular paver plate 114 (FIGS. 92-95) so pavers may be installed, there is at least one set of hexagonal orifice groupings 134 that matingly engage a set of hexagonal pins 136 on the bottom face of the paver plate 114. In the preferred embodiment this set of hexagonal orifice groupings has three orifices to engage a set of three hexagonal pins 136. There are 4 sets of the orifice groupings 134 and the pins 136.

Lastly, the top face of the base mounting plate 4, has a central circular depression 56 for the insertion of a matingly sized circular bubble level and a series of four shallow, linear card slots 58 placed 90 degrees apart to hold a planar transit level readout card along its bottom edge. These card slots 58 begin at the edge of the circular depression 56 and extend radially outward therefrom and reside perpendicular to all adjacent card slots 58. All four of the transit level readout card slots are conformed to accept a bottom edge of a conventional transit card, and are equidistant from the central circular depression for the bubble level insert.

Post 121 (FIGS. 30-33) is a cylindrical member that has a series of radial tabs 423 extending normally from its exterior face. The orientation and size of these radial tabs 423 allow the post 121 to be plunged into the lock orifice 122 of base mounting plate 4, with its radial tabs 423 passing between and past the radial slots in the cylindrical wall of the lock orifice 122. The post 121 can be rotated so that its radial tabs 423 do not align with the radial slots and are trapped in the lock orifice 122. With this insertion and locking rotation, the post 121 protrudes perpendicularly from the top face of the base mounting plate 4. There is a hex slot 127 in the top end of the post 121 that accepts a hex wrench to lock or facilitate the rotation after insertion into the base mounting plate 4. The outer diameter of the post is sized for frictional engagement within the central bore of the post block 94.

The post has a height taken along its linear axis that exceeds the thickness of the post block such that when the base mounting plate with the post extending normally therefrom its planar top is connected to the reversible structural panel, the post will extend beyond the top of the post block and into the cell of the reversible structural panel.

Post Block 94 (FIGS. 34-36) is a locking plug with a central bore 120 that has a thin flanged top face 96 with a profile that is larger than the inner dimensions of the internal cell flange 70. The remainder of its body approximates the dimensions of the bottom openings 71 in the bottom face 74 of the reversible structural panel. The post block 94 has a side wall that defines its thickness. It has a series of grooves 98 formed about its side wall from which extend a series of spring locking clips 100. These locking clips 100 have angled locking lugs 102 at their distal ends that are located at a distance along the locking clips 100 from the top face 96 that is equal to the thickness (depth) of the internal cell flange 70 of the reversible structural panel. When the post block 94 is inserted into the lower opening 71 from the bottom face 74 of the panel 60, the spring locking clips 100 with their angled locking lugs 102 will flex inward slightly as they contact and slide up the side walls of the flange 70 until the flanged top face 96 of the post block 94 contacts the bottom face 74 of the panel 60 at which time the angled locking lugs 102 expand outward to engage the upper face of the flange 70 and connect the post 121 or threaded post 92 to the reversible structural panel 60.

When the post 121 is attached to the base mounting plate 4 and inserted in the central bore through the post block 94, it laterally stabilizes and holds the gravitationally mounted reversible structural panel 60 on the Base mounting plate 4. There is no direct connection as the reversible structural panel is only held in this position by gravity.

This combination of a post 121, post block 94 and reversible structural panel 60 (in combination with the IFT and OFT of the system components) allow for a pinned interlock between a reversible structural panel and a stanchion assembly making the assembly a unitary element rather than a loose assembly of components.

Threaded Post 92 (FIGS. 37-40) is an internally threaded cylinder with a planar, crescent shaped foot 113 formed at its bottom. This conforms shaped recess 123 on the bottom of the base mounting plate 4. This threaded post 92 is used for high lift wind load situations. It is made of a salt water corrosion resistant polymer.

Polymer Bolt 104 (FIGS. 43-45) is a conventional externally threaded bolt matingly conformed to the internal thread of the threaded post 92, that is made of a polymer that will resist salt water corrosion. It has an extra large planar head that exceeds the diameter of the bottom orifice in the reversible structural panel 60. This allows the bolt to self center in the cell. It has a screw recess (Flat, Phillips, Allen, Socket or Torx) in its head for removal. Around its shaft 122 is a compressible wound retrieval spring 108 for ease of removal. It is made of a salt water corrosion resistant polymer.

Retrieval Spring 108 (FIGS. 44, 45) is a helical wound compression spring tapering in diameter from its top to bottom. It is made of a salt water corrosion resistant material such as stainless steel.

Spacer 106 (FIGS. 41, 42) is a polymer disk sized larger than the orifice in the bottom of the reversible structural panel 60 but smaller than the cell width. It is made of a salt water corrosion resistant polymer.

Figure 44:
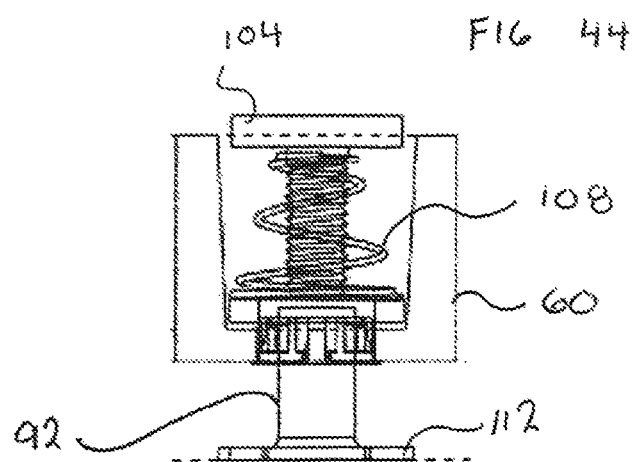
FIG. 44 is an assembled view of the high wind lift load hold down assembly.
Figure 45:
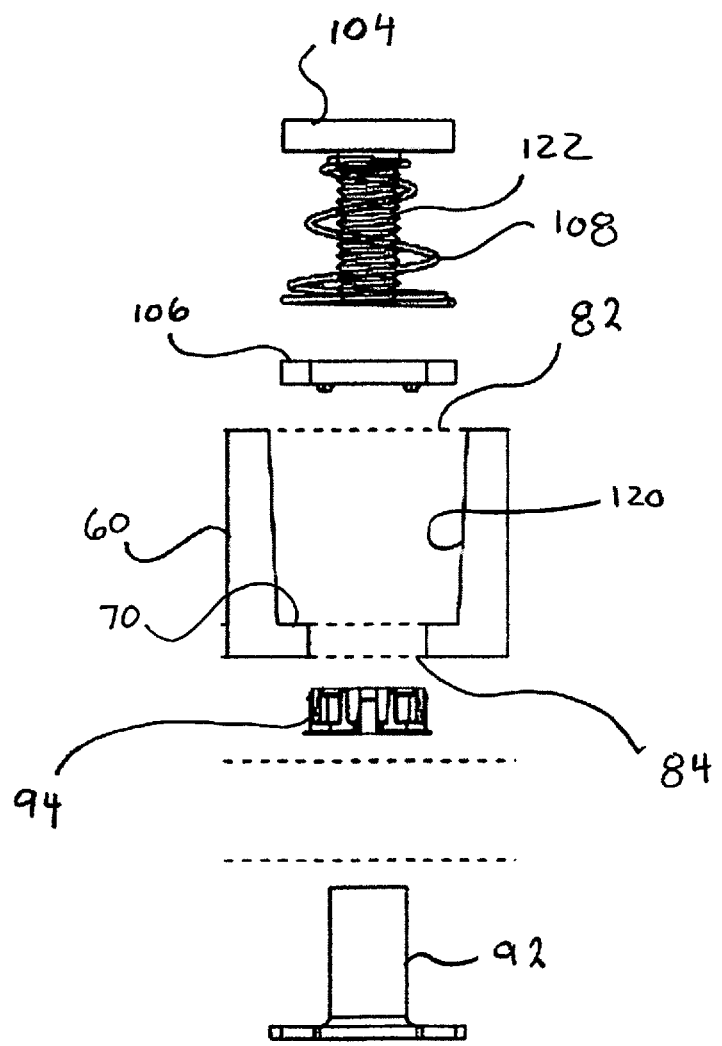
FIG. 45 is a disassembled view of the high wind lift load hold down assembly.
Figure 47:
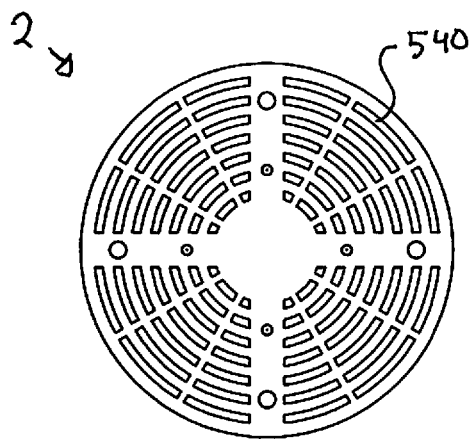
FIG. 47 is a top view of the shim plate.
Figure 46:
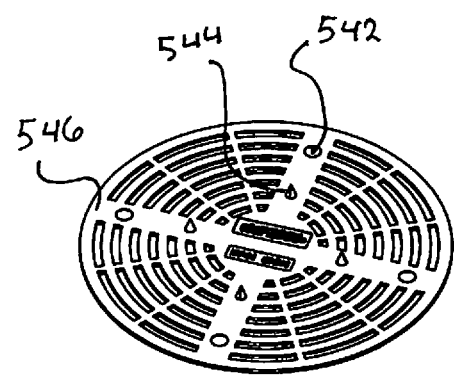
FIG. 46 is a perspective view of the anchor plate.
Figure 48:
FIG. 48 is a side view of the anchor plate.
Figure 49:
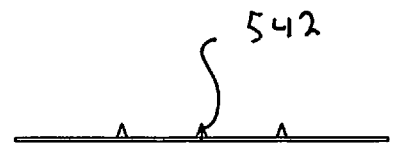
FIG. 49 is a side view of the anchor plate rotated 90 degrees.

Referencing FIGS. 44 and 45, the application of these components to combat a high wind lift load condition that could dislodge the finish flooring can best be seen. To lock the reversible structural panel 60 to the base mounting plate 4, The post block 92 is fit into the bottom opening of a cell. The top end of the threaded post 92 is pushed through the first set of orifices 122 in the base mounting plate 4 until the foot 113 engages in the shaped recess 123 in the bottom face of the base mounting plate to lock the threaded post's bottom foot 113 beneath the base mounting plate 4. (The base mounting plate 4 is suitably connected to the decking.) The threaded post 92 is inserted through the central orifice 120 in the post block 94 such that it extends slightly past the post block 94. The spacer 106 is inserted down into the cell such that it rests on the inner flange 70. The profile of the spacer 106 extends in all directions to the cell sides 120, and its central orifice is sized for the passage of the threaded shaft 122 of the polymer bolt 104 there through. In this way the spacer 106 is able to spread out the tensile forces of the polymer bolt head 124 onto all of the available surface area of the inner flange 70.

A self centering polymer bolt 104 is placed into the reversible structural panel's cell. This bolt 104 has a spiral wound spring 108 wrapped about its threaded shaft. This is sized just slightly smaller than the dimensions of the cell. The spring 108 centers the bolt 104 above the threaded orifice in the threaded post 92 to simplify threaded engagement. The spacer 108 is flexible so as to allow some limited movement of the bolt 106 inside the cell. When the bolt is tightened the reversible structural panel 60 is securely attached to the deck via the base mounting plate 4. This configuration allows the adjacent panels to be tied together on a single base mounting plate 4 at their corners.

It is envisioned that there may be the need at some time to tighten, or remove and replace these bolts. Since it is likely that this will have to be done through a small access hole drilled through the flooring on top of the structural panel 60, the self centering aspect allows the installer to do this in a minimal of room and with the smallest access hole possible. In the preferred embodiment, the top of the self centering bolt 124 has a Torx™ recess for ease of connection of the driving tool to the bolt 104.

The intended application of this embodiment of the mechanical fastening system is for a saltwater environment where metal or steel fasteners are not desirable. For this reason the threaded post 92 and the polymer bolt 104 and washer 106 are made of a polymer that will not corrode or oxidize in the ocean air environment.

It is also envisioned where the post block, spring and the spacer are not utilized with the threaded post, and bolt. This would constrain the structural panel vertically, yet allow for some lateral movement of the reversible structural panel. The post block, spacer and spring may be incorporated as a group or individually.

Third Substrate Component Assembly

Base Mounting Plate 4 (FIGS. 27-30) There is only one top member of any stacked array of the precision height adjustable 2flooring substrate support system. This is the base mounting plate 4. This serves to support the reversible structural panel 60 or paver plates 114 (with or without the wedge plate 218), and the framing braces 212. On the bottom face of the base mounting plate 4 there is a series of internally facing twist lock engagement teeth ("IFT") 520. These IFT's engage with a series of outwardly facing twist lock engagement teeth ("OFT") 532 located on external flanges on other component plates such as found on the top face of the stacker plate 216. (FIGS. 73-77) It is through the engagement of the series of IFT with the series of OFT that the various plates are able to connect for leveling and height adjustments. In this way the "plunge and twist" style of interlocking frictional engagement between members (as is well know in the art) can be utilized to couple members to attain the desired height. There is also a central stabilization groove 64 formed thereon to accept the central ring flanges of other components. This prevents sag or deformation under load.

Shim Plate 2 (FIGS. 46-49) is a circular plate with drainage slots 540 and bolting orifices 542 there through. There are conical projections 544 extending downward from the bottom face 546 to enhance its grip in the deck. It is used as a base upon which several other plates such as a stanchion bottom plate or a spacer plate may be stacked.

The Stanchion Assembly 7 (FIGS. 113, 114, 116) is comprised of a stanchion post 9, sandwiched between a stanchion top plate 116 and a stanchion bottom plate 110. The stanchion assembly 7 is made up of a stanchion post 9 (polymer pipe) having a stanchion top plate 6 frictionally affixed about one end, and a stanchion bottom plate 10 frictionally affixed about the other end. In the preferred embodiment the stanchion post is a Schedule 40 four inch nominal pipe made of ABS, PVC or CPCV that is commercially available, and field cut to height. The tolerance for precision in the tilt angle and the height is quite generous as these can be adjusted or compensated for through combinations with the wide base assembly 220, the stacker plates 216 the leveler plate assembly 11, and the shim plate 2. (Additionally with the wedge plate 218 but only atop of the base mounting plate 4.)

Stanchion Top Plate 116 (FIGS. 68-72) The top face of the stanchion top plate 116 (FIGS. 15-19) has a peripheral flange ring 70 that has a series of OFT 532 and twist lock gaps 74 that allow for the interlocking engagement of matingly conformed IFT 520 on the bottom faces of other components of the precision height adjustable 3flooring substrate support system. Here the "plunge and twist" style of interlocking frictional engagement between components has been utilized. This stanchion top plate 116 also has a central raised ring 75 extending therefrom that is sized to fit within the central stabilization groove formed thereon the bottom face of other components. Within this central raised ring 75 is a circular bubble level insert located at a midpoint on the top face.

Extending downward from the bottom face of the stanchion top plate 116 is a lower circular sleeve 84 extending normally therefrom that accepts internally, the outer diameter of the stanchion post 9 for a frictional engagement. On the exterior surface of the lower circular sleeve 84 resides a series of four brace loops 82 that are 90 degrees apart to retain pivotable support rods 252 (FIG. 121). The stanchion bottom plate 110 has a similar circular sleeve and brace loops extending from its top face.

Stanchion Bottom Plate 110 (FIGS. 63-67) has a top face with an upper circular sleeve 78 extending normally therefrom that accepts internally the bottom of stanchion post 9 for a frictional engagement. On the exterior surface of the upper circular sleeve 78 resides a series of four brace loops 82 that are 90 degrees apart to retain pivotable support rods 252. It also has a series of screw orifices 66 about the inner perimeter to allow the direction screwed connection to the deck.

The bottom face of the stanchion bottom plate (has a groove ring that has a series of IFT 520 and twist lock spaces 64 that allow for the interlocking engagement of matingly conformed EFT 532 on the top faces of other members of the precision height adjustable 4flooring substrate support system. However, on this component there is no central stabilization groove to accept the central ring flanges on other components.

Support Guide 226 (FIGS. 120, 122, 123) is a C shaped tube with a pivot post 150 extending at 90 degrees from one end. There is a locking lug 152 on the pivot post 150. The pivot post 150 is inserted into the framing brace loops 82 on the assembled stanchion assembly 7. Into the C of two different support guides 226 is glued a solid support rod 252 (generally of a lightweight material such as nylon or a polymer) (FIG. 121). Teeth 154 help grip the rod 252 and hold it in place while the glue is setting up. The support guides 226 may be oriented in a horizontal or X pattern between adjacent stanchion assemblies depending upon the type of lateral support needed.

Support Rod 252 (FIG. 121) a solid polymer rod sized for connection with the support guide.

Leveler Plate Assembly 11 (FIG. 118) is a two-part leveling assembly 11. This assembly alters the angle in either none, one or two axes simultaneously and is used to compensate for field conditions. Its angle is adjusted by locking the rotation of the two leveler plates at the desired location.

Leveler Top Plate 213 (FIGS. 83-87) has a wedge configuration and has a raised peripheral flange 162 on its top face that has OFT 532 thereon. In this way it can engage with other components of the system that have IFT 520. Its bottom face has a series of interlocking slots 164 that engage in a series of interlocking tabs 166 on the top face of the leveler bottom plate 215. In it center on the top face is a circular recess 299 for the retention of the bubble level. There is also a retention screw that matingly engages one of the four screw recesses 265 90 radial degrees apart in the leveler bottom plate 215.

Leveler Bottom Plate 215 (FIGS. 78-82) has a bottom face with a series of IFT 520 for engagement with the OFT 532 on such components as the top of the stacker plate. The leveler bottom plate 215 also has a taper across its body.

Framing Braces 212 (FIGS. 96-99) are rigid, rectangular, planar plates with a trapezoidal cross section and having two posts 199 extending normally from either end and through screw orifices 66 with tapered heads. The long edge sides 84 are angled at 45 degrees with one side having two tabs 86 and one side having two matingly engageable slots 88 for these tabs. In this way the framing braces 212 may be locked together to form a single perpendicular brace. (FIGS. 106-108) These matingly engage into either to top face or the bottom face of the base support plate 4. The two tapered posts 199 extending from either end can be inserted for frictional engagement into the grouped orifices 126 of the base mounting plate 4. A plethora of angles may be accomplished on the base mounting plate 4 with the framing braces 212. Multiple framing braces 212 may be locked together to form a single perpendicular brace.

Paver Plate 114 (FIGS. 92-95) has a 90 degree wedge shaped bottom plate 198 plate with two perpendicular sides 197 extending perpendicularly therefrom said bottom plate and that meet at a 90 degree corner. The bottom plate 198 has an embossed pattern thereon that provides a gap for mastic. The paver tile rests on the top of the embossment ridges so there is a uniformity of paver height across the floor when affixed.

There are three hexagonal locating paver plate pins 136 extending from the bottom face of the plate. These engage into matingly conformed hexagonal orifices in the base mounting plate. These locate up to four paver plates on each base mounting plate 4 such that the 90 degree corner is at the approximate center of the base mounting plate. In this way four paver plates can be connected to a single base mounting plate. When all four paver plates are connected to a single base mounting plate, all the side walls of all the adjacent paver plates reside in a spaced but parallel configuration. Although there are three pins used in the preferred embodiment, it is known that a lesser number of pins would suffice provided that the configuration prevents the rotation of the paver plate on the base mounting plate and maintains the linear spacing between the other three adjacent paver plates on the base mounting plate.

With triangular paver plates 114 connected to a base mounting plate, that may or may not be interlocked via the IFT and OFT plunge and twist locking system to a stanchion top plate for height adjustment, the paver tiles can span onto adjacent base mounting plates also with paver plates to form a finished floor. The paver tiles may be adhesively affixed to the paver plate so that the paver tiles can be individually removed.

Stacker Plates 216 (FIGS. 73-77) are circular plates approximately ½ inch thick each and are used to raise up any of the components so that either of the mounting plates can be raised to the desired height. The top face of the stacker plate has a flange ring 70 that has a series of OFT 532 and twist lock gaps that allow for the interlocking engagement of matingly conformed IFT 520 on the bottom faces of other components of the precision height adjustable 5flooring substrate support system. In this way the "plunge and twist" style of interlocking frictional engagement between components can be utilized. This stacker plate top face also has a central raised ring 75 extending therefrom that is sized to fit within the central stabilization groove formed thereon the bottom face of other components. There are screw orifices 66 formed there through and anchor plate protrusion rings 162 to secure the stacker plate 16 to the shim plate 2. Within the central raised ring 75 is a circular bubble level insert located at the midpoint of the central raised ring and the midpoint of the top face.

The bottom face of the stacker plate 216 has a lock ring 92 that has a series of IFT 520 and twist lock spaces that allow for the interlocking engagement of matingly conformed OFT 532 on the top faces of other members of the precision height adjustable 6flooring substrate support system. This component also has a central stabilization groove to accept the central ring flanges on other components.

Wedge Plate 218 (FIGS. 88-91) has a taper across its body and a set of locating posts 130 that allow it to reside atop of the base mounting plate 4. It has through orifices and slots that conform with those on the base mounting plate 4 so that it may be used between the base mounting plate 4 and the structural panel 30 or the paver plates 114 or the brick posts 233. The wedge plate 218 has a ½° slope across the body and a series of orifices and slots formed there through as discussed herein. This allows any number of these wedge plates to be coupled together to overcome any angle on the deck base and ensure that the mounting plates are horizontal when installed. Its bottom face is generally unadorned and flat for attachment by mastic/adhesive.

Wide Base Assembly 220 (FIGS. 111, 119) is made of a wide base 24 into which is internally screwed a micro adjust plate 222. The wide base 224 is a circular plate with a ribbed external flange 102 extending normally therefrom its bottom edge. This flange has screw orifices preferably as screw orifice posts 104 formed there through. The top face has an internally threaded raised ring 106 extending normally therefrom and a central raised ring 75 with a central orifice extending therefrom the wide base 24, that is sized to fit within the central ring 106 formed thereon the bottom face of the micro adjust plate 222. It has the broadest footprint of any of the components.

Micro Adjust Plate 222 (FIGS. 58-62) has an externally threaded external raised ring 110 that threadingly engages the internally threaded raised ring 106 of the wide base 224. Screwing together these two components allows for the precise height adjustment of the wide base assembly 220 over a one inch range. As they are screwed together the center is stabilized by the frictional engagement between their respective central rings. Inside the externally threaded raised ring 106 is another concentric flange ring 70 that has a series of OFT 532 and twist lock gaps that allow for the interlocking engagement of matingly conformed IFT 520 on the bottom faces of other components of the precision height adjustable 7flooring substrate support system. There is a central ring 71 used for support as it aligns under the central raised ring 75 of the wide base.

Wide Base 224 (FIGS. 53-57) is a circular plate with a ribbed external flange 102 extending normally therefrom its bottom edge that broadens its footprint. This flange has screw orifice posts 104 formed there through. The top face has an internally threaded raised ring 106 extending normally therefrom and a central raised ring 75 with a central orifice extending therefrom the wide base 24, that is sized to fit within the central ring 106 formed thereon the bottom face of the micro adjust plate 222. It has the broadest footprint of any of the components.

Wide Base Wedge Plate 225 (FIGS. 50-52) is a tapered circular plate that is suited for placement only below the wide base 224. It is similar in many respects to the wedge plate in its design as it has drainage orifices 266, screw orifices 277 about its perimeter and has a one degree taper across its body.

Brick Post 233 (FIGS. 100-103) is planar post that has as its bottom half, a pair of legs 235 that lock into the corresponding slots in the top face of the base mounting plate 4. The bottom corner of each leg has a locking point. Its top half is made with ribs 241 of varying thicknesses to give different aesthetic spacer lines between adjacent pavers/bricks for drainage.

Bubble Level is a commonly found circular bubble level filed with a highly visible dyed fluid and an air bubble. It has a centrally domed top and a level indicator ring sized for the air bubble within its ring. It is commonly used for leveling RVs, travel trailers and the like.

Exemplary System Leveling and Height Adjustment Configurations

Figure 19:
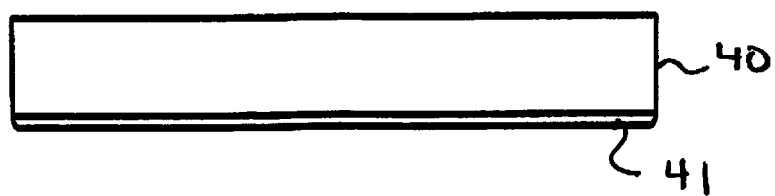
FIG. 19 is a side view of s float plate.
Figure 109:
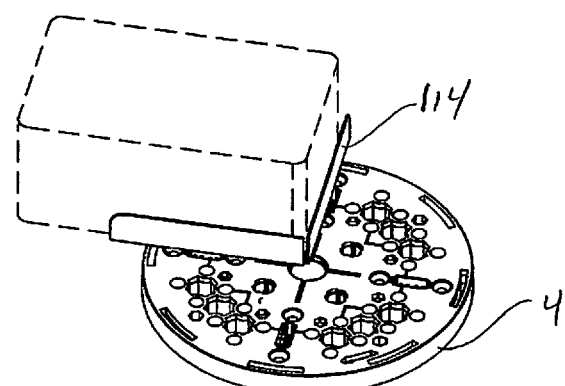
FIG. 109 is a perspective view of the paver plate installed on the base mounting plate.
Figure 110:
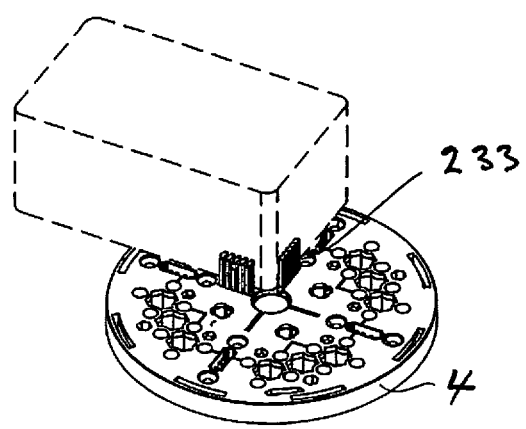
FIG. 110 is a perspective view of the brick post installed on the base mounting plate.

FIGS. 109 to 19 show common connections between the base mounting plate 4 and other system leveling and height adjusting components. In the simplest variations FIGS. 109 and 110, the base mounting plate has been glued, screwed or just resting atop a planar, level deck surface. Onto its top face is a paver plate 144 that has its three hexagonal locating paver plate pins matingly engaged with the hexagonal orifices in the base mounting plate. These locate four paver plate corners equally spaced on the base mounting plate 4. (FIG. 109) In FIG. 110, two brick posts 233 have been similarly inserting into their matingly conforming slots on the base mounting plate 4 so as to locate the corners of bricks.

Figure 106:
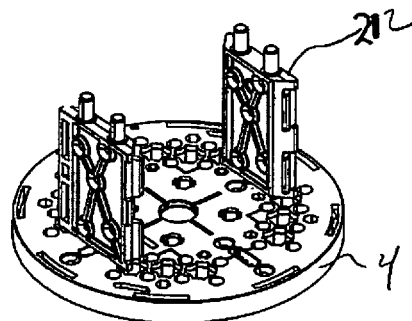
FIG. 106 is a top perspective view of framing braces for double two by dimensional framing members attached to the base mounting plate.
Figure 107:
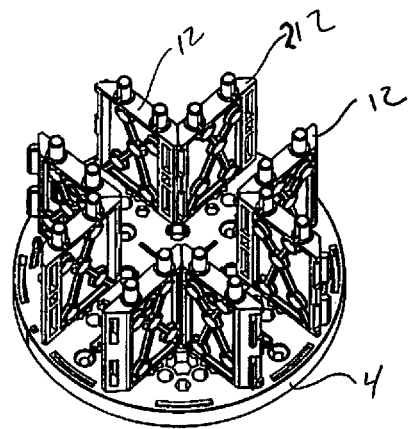
FIG. 107 is a top perspective view of framing braces for single two by dimensional framing members attached to the base mounting plate.
Figure 108:
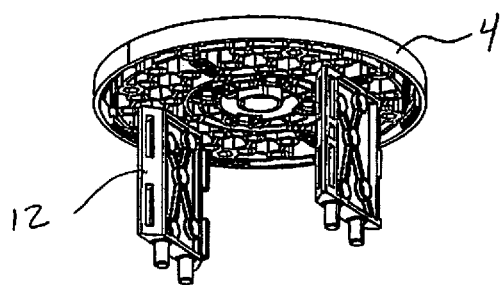
FIG. 108 is a bottom perspective view of framing braces for double two by dimensional framing members attached to the base mounting plate.

Looking at FIGS. 106-108, the base mounting plate 4 is also used to connect to structural lumber joists below (as in a deck framing) to allow the addition of structural lumber (as for deck framing) above without the need for the deck framing to penetrate any roofing/deck waterproofing membrane.

Figure 111:
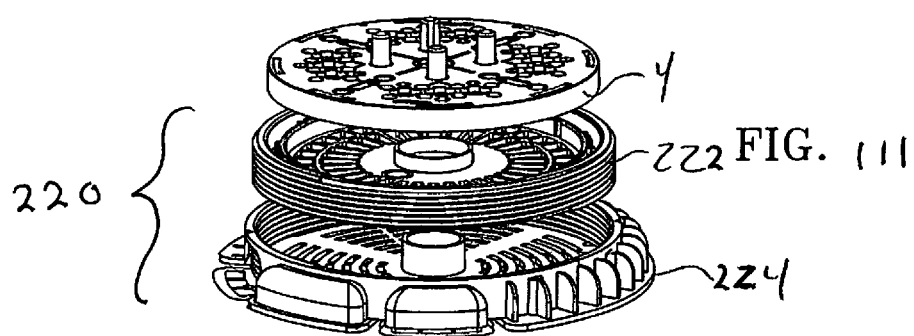
FIGS. 111 to 119 are perspective views of various combinations of system components beneath the base mounting plate.

FIG. 111 shows an exploded view of a floor support system made of a base mounting plate 4 with its IFT 520 to be interlocked with the OFT 532 of a micro adjust plate 222 which is about to have its external thread matingly engaged with the internal thread of a wide base 224. Here very little height is needed with no leveling. Note that there are posts 121 twist locked into the top face of the base mounting plate 4 for attachment to the reversible support panel 60.

Figure 112:
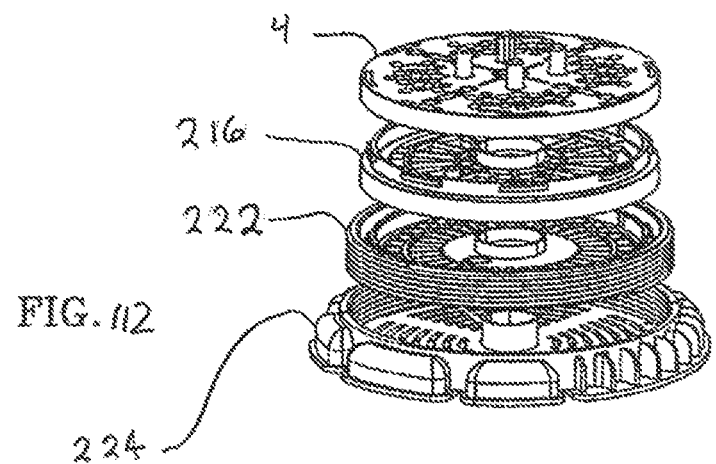

FIG. 112 shows the same assembly as FIG. 111 but with a stacker plate 216 added between the base mounting plate 4 and the micro adjust plate 222. Here the twist and lock feature of OFTs and IFTs is utilized on both faces of the stacker plate 216. Here an additional one half inch of height was added.

Figure 113:
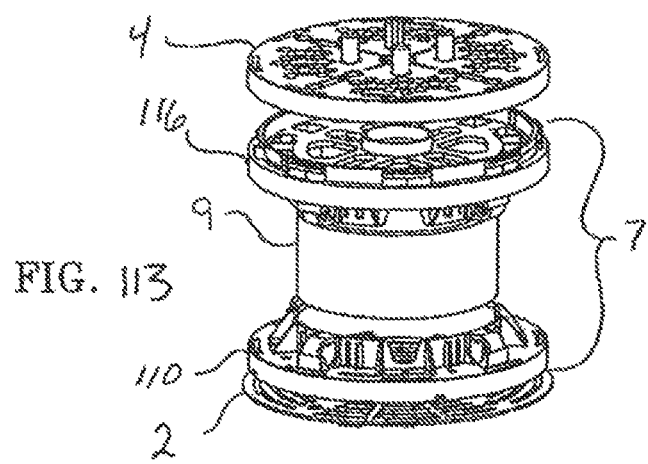

FIG. 113 shows a base mounting plate 4 with its IFT 520 engaging with the OFT 532 of the stanchion top plate 116 of a stanchion assembly 7 mounted on an anchor plate that may be screwed or just resting on the deck. Here height with no leveling was added by the system components. Also there are posts 121 twist locked into the top face of the base mounting plate 4 for attachment to the reversible support panel 60.

Figure 114:
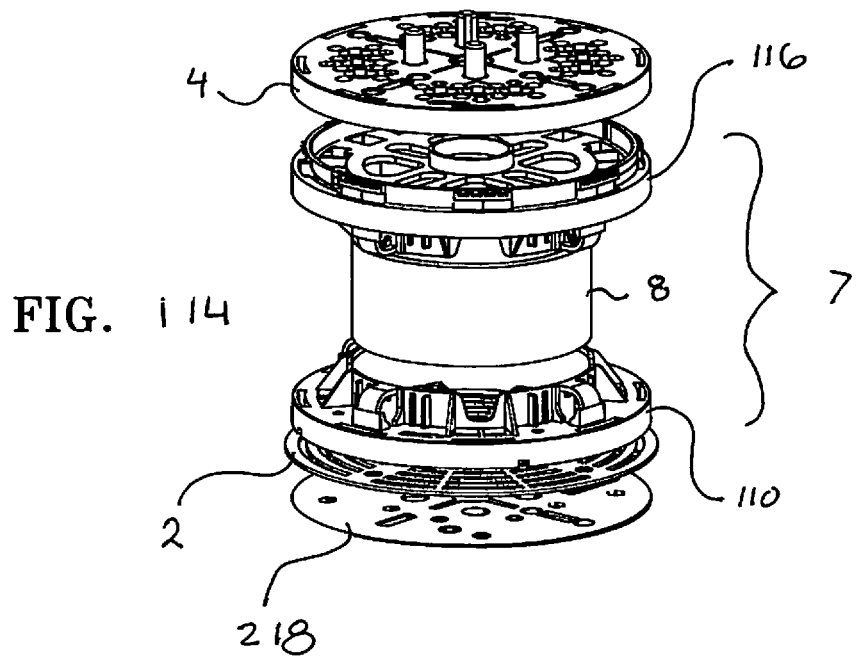

FIG. 114 shows the same arrangement as FIG. 113 but with a ½ degree wedge plate 218 below the anchor plate 2. Here minimal slope adjustment was needed.

Figure 115:
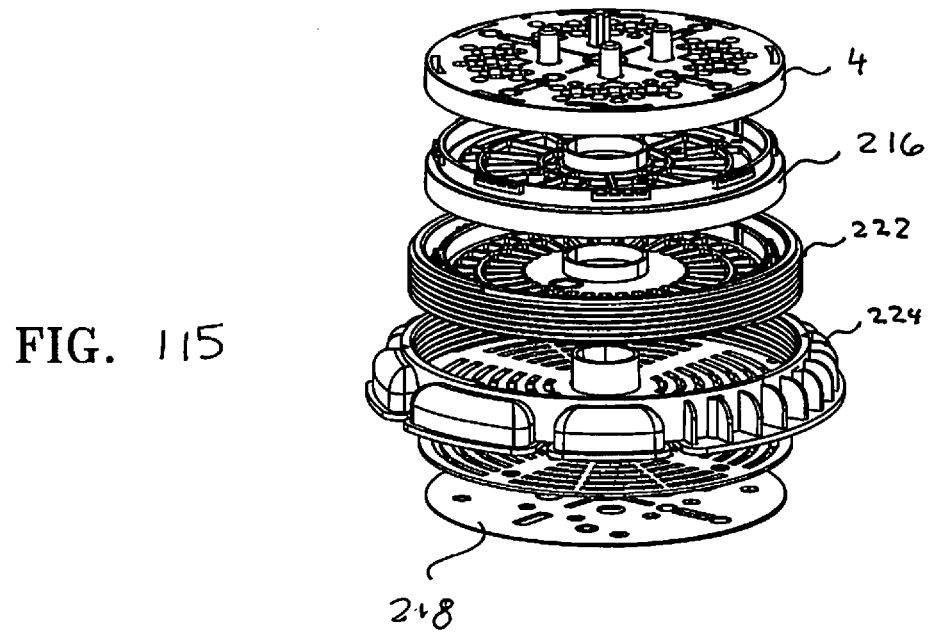

FIG. 115 shows a base mounting plate 4 interlocking a stacker plate 216 which interlocks a micro adjust plate 222 in a wide base 224 atop an anchor plate atop a wedge plate 218. Here precise height adjustment beyond the reach of the wide base assembly was needed with minimal slope adjustment.

Figure 116:
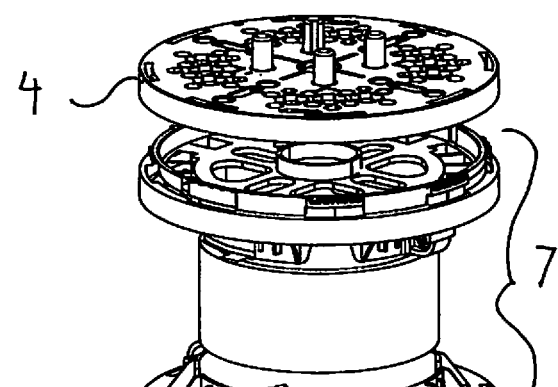

FIG. 116 shows the arrangement of FIG. 114 but with the addition of the wide base assembly 220 for precise height adjustment.

Figure 117:
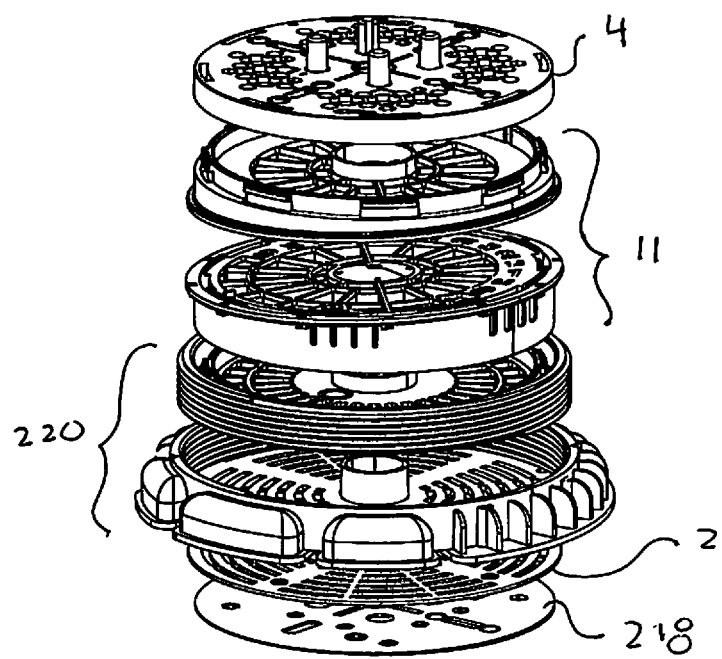

FIG. 117 shows the base mounting plate 4 atop a leveler plate assembly 11 atop a wide base assembly 220 atop an anchor plate 2 atop a wedge plate 218.

Figure 118:
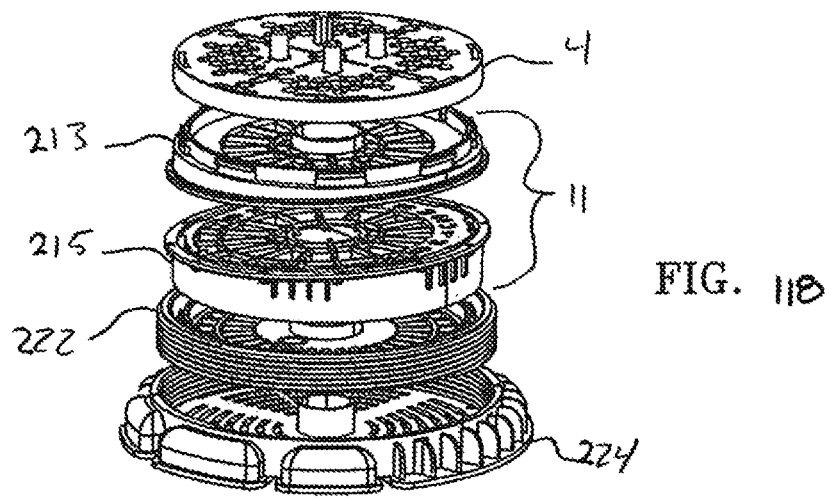
Figure 121:
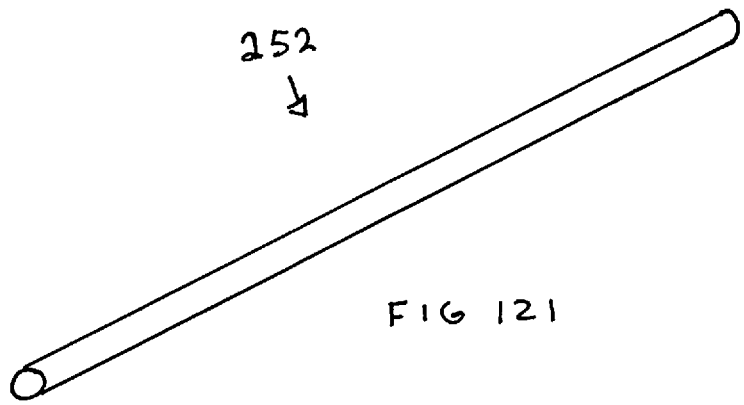
Figure 119:
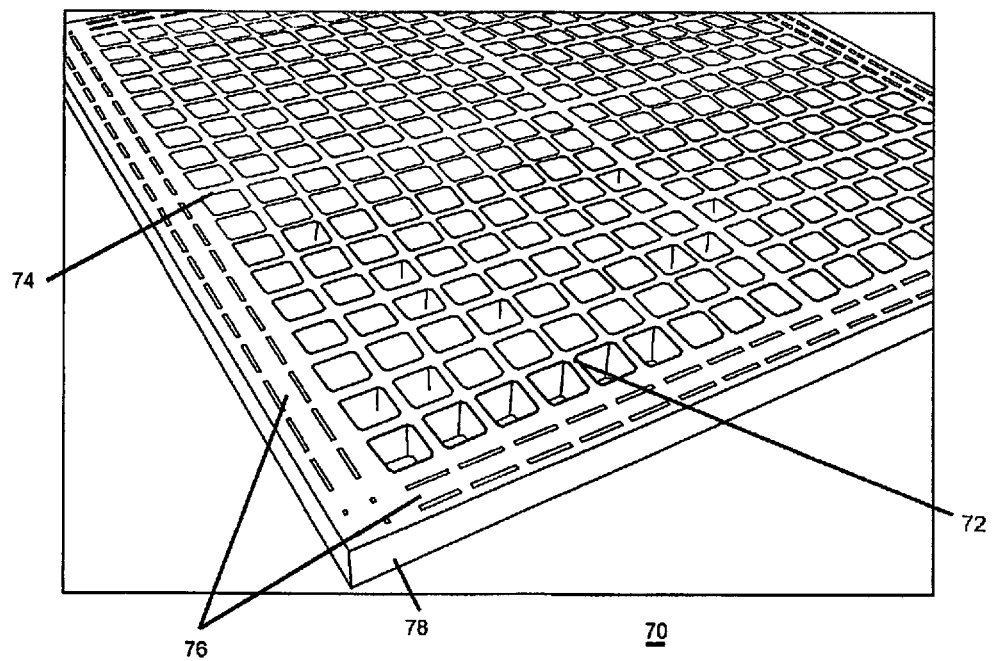

FIG. 118 shows the same arrangement of FIG. 117 but without the anchor plate 2 and wedge plate 218.

Figure 119:
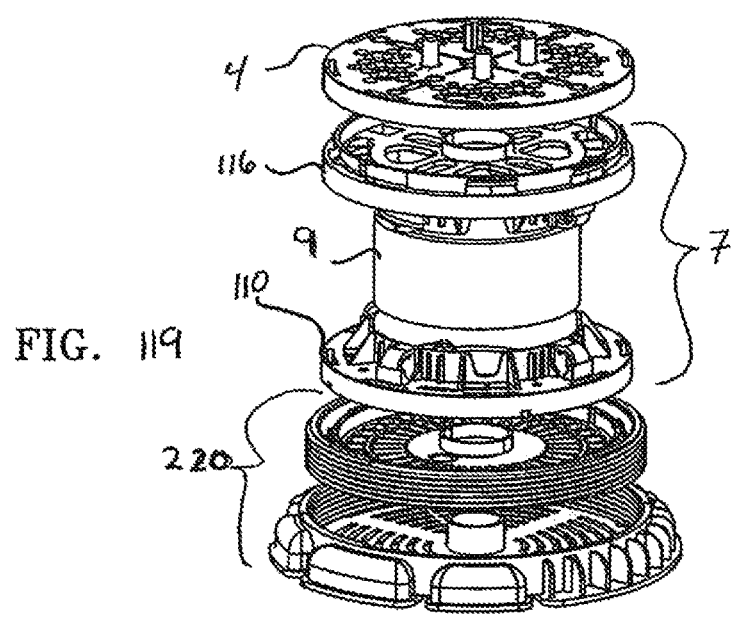

FIG. 119 shows the same arrangement o FIG. 116 but without the anchor plate 2 and wedge plate 218.

The base mounting plate 4 may also be used atop of the height adjusting stanchion assembly 7, the stacker plates 216, the wedge plate 218 the wide base assembly 220, or any combination thereof.

There is a plethora of possible combinations used to overcome field situations of height and slope. The aforementioned combinations are only a few of the possibilities. The complete interconnectivity of the system components can be best seen with reference to TABLES A and B. One skilled in the art would be able to construct multiple other configurations based on the interconnectivity of the components.

The following table lists all the parts of the flooring support system and delineates their novel structural features that allow their interconnectivity and function.

TABLE B

FLOORING SUPPORT SYSTEM STRUCTURAL FEATURES

| Element | Name | TOP FACE FEATURES | BOTTOM FACE FEATURES | OTHER FEATURES |
|---|---|---|---|---|
| FIRST SUBSTRATE COMPONENT ASSEMBLY ||||| 
| 30 | Structural Panel | Rectangular grid of identical rectangular open cells, internal edges of each open cell have depressions for clip retention | Rectangular grid of identical rectangular open cells | Cuttable along slots at specific sizes |
| 32 | Offset Panel Retaining Clip | Square steel plate with offset bolt orifice and all four peripheral edges bent normally into sides away from the plane of the clip with each side's outer edge bent away from clip body | Offset bolt orifice in hemispherical indentation | |
| 34 | Bowl Head Screw | Hemispherical head below planar driven face | | Stainless steel |
| 40 | Float plate | Planar base with five openings | Two slots to receive the spring arms with locking orifices | |
| 42 | Spring Arms | Upper lip, Locking tabs | | Used in pairs with top flanges facing opposite directions |
| 41 | Adhesive Friction Disk (Optional) | Adhesive tape on top face | Matte finish | Circular & slightly larger than float plate's diameter |
| Second Substrate Component Assembly ||||| 
| 60 | Reversible Structural Panel | Largest cell opening on top and frangible between cells | Internal flange at bottom of cell and cut lines between cells | Planar Polymer panel with different sized cell openings on top and bottom faces |
| 76 | Reversible Panel Retaining Clip | Square with central hemispherical depression | | |
| 34 | Bowl Head Screw | Hemispherical head below planar driven face | | Stainless steel |

TABLE B-continued

FLOORING SUPPORT SYSTEM STRUCTURAL FEATURES

| Element | Name | TOP FACE FEATURES | BOTTOM FACE FEATURES | OTHER FEATURES |
|---|---|---|---|---|
| 121 | Post | Cylindrical with rotational locking tabs | | Configured for top insertion of hex key |
| 94 | Post Block | Square with central orifice to accept bolt or threaded bolt | Octagonal with 4 spring clips for locking extending from sides | Spring clips have locking lugs extending from bottom |
| 92 | Threaded Post | Cylindrical with crescent shaped locking foot | | Internally threaded to accept bolt |
| 104 | Bolt | Enlarged head with hex slot | | Made of polymer |
| 108 | Retrieval Spring | Helical wound steel spring | | Tapers narrowing from top to bottom |
| 106 | Spacer | Square with diameter larger than the bottom cell orifices of reversible structural panel | | Central orifice sized to diameter of post and threaded post |
| | | Third Substrate Component Assembly | | |
| 4 | Base Mounting Plate (for pavers, lumber and frames) | Hexagonal slots for paver plate pins; orifices for connection to framing braces; slots to receive paver plate pins, orifices to receive posts and threaded posts, tapered orifices for screws or wedge plate posts, slots for transit readout card, central depression for bubble level | Outer ring with internally facing teeth; depressed regions to house base of threaded post IFT | Through screw orifices with tapered heads |
| 2 | ~~Anchor~~ Shim Plate | Screw orifices and drainage slots there through | Four equidistant spaced conical protrusions | |
| 7 | Stanchion Assembly | Made of top, stanchion and bottom | | |
| 116 | Stanchion Top Plate | Raised perimeter flange on bottom, raised central ring for bubble level OFT | Raised ring sized to internally accept stanchion; Brace loops on external side of raised ring to adjustably retain support rods | |
| 8 | Stanchion Post | Commercially available circular pipe sized to internally fit into raised rings | | Polymer ABS Pipe |
| 110 | Stanchion Bottom Plate | Raised ring sized to internally accept stanchion; Brace loops on external side of raised ring to adjustably retain support rod | Perimeter groove, screw rings with orifices, IFT | |

TABLE B-continued

FLOORING SUPPORT SYSTEM STRUCTURAL FEATURES

| Element | Name | TOP FACE FEATURES | BOTTOM FACE FEATURES | OTHER FEATURES |
|---|---|---|---|---|
| 226 | Support Guide | C shaped linear member with round connector peg extending normally from one end | | |
| 252 | Support Rod | A circular rod sized to be retained within the C shaped linear member | | |
| 11 | Leveler Plate Assembly | Made of Leveler top and leveler bottom Allows locking in various rotational configurations to correct at the top for a bottom slope | | |
| 213 | Leveler Top Plate | Raised central ring for bubble level, lock screw and screw retention orifice to lock plates together, raised perimeter ring with OFT | Circumferential perimeter groove to accept alignment tabs | Tapered bodies with 6 degrees of adjustment total |
| 215 | Leveler Bottom Plate | Alignment tabs extending up from perimeter, holes for lock screws, screw orifices, rotational degree markings | Circumferential perimeter groove, IFT | |
| 212 | Framing Braces | Rectangular, planar plate with trapezoidal cross section having two posts at either end and through screw orifices with tapered heads on the planar faces thereof; long edge sides angled at 45 degrees with one side having two tabs and one side having two matingly engageable slots | | |
| | Bugle Head Screw | | | Conventional construction fastening member |
| 114 | Paver Plate | 90 degree pie shaped wedge having sides on the two non circular perimeter edges; | Three hexagonal locating paver plate pins | Apex of two sides centers paver on base mounting plate |
| 216 | Stacker Plates | Raised perimeter flange with EFT, raised central ring for bubble level | Perimeter groove with IFT, | Through screw orifices |
| 218 | ½° Wedge Plate | Tapers in thickness ½ degree across plate, | Has orifices and slots identical to those on base mounting plate | Rotatable in 90 degree increments |
| 220 | Wide Base Assembly | Made of micro adjust plate and wide base | | |
| 222 | Micro Adjust Plate | Central ring flange with through orifice; Raised internal circular flange adjacent outer perimeter that is externally threaded and with EFT | | |
| 224 | Wide Base | Raised central post fits around central ring flange and holds bubble level, peripheral raised flange externally threaded | Screw holes, external flange to broaden footprint | |

TABLE B-continued

FLOORING SUPPORT SYSTEM STRUCTURAL FEATURES

| Element | Name | TOP FACE FEATURES | BOTTOM FACE FEATURES | OTHER FEATURES |
|---|---|---|---|---|
| 225 | Wide Base Wedge Plate | Perimeter circle of screw holes, drainage slots | | ½ degree taper |
| 233 | Brick Post | Planar with differing thicknesses and external tabs on bottom or each locking leg | | Parallel, vertical linear ridges in both sides of top half |
| | Bubble Level | Circular | | Sized to fit into central circular recesses in top leveler plate, stacker plate, base mounting plate and micro adjust plate |

System Advantages

In situations where the underlying surface is sloped, uneven, has protuberances or penetrations it is desirable to cheaply and securely raise the sub flooring system to a height that allows it to be horizontally planar or float just above a waterproofing deck surface. While cutting stanchions to accurately repeatable height dimensions will allow for a truly planar surface on another truly planar surface, such a working environment is rare. The predominant working surfaces are not completely level and micro adjustments in height must be made in the field to attain this. Attempting to adjust the height of the cut stanchions is far too inaccurate. The present system of interlocking members allows for a quick, simple and precise method for adjusting the height of the system at all supported points so as to allow for a truly planar array of structural panels.

In a particular embodiment, the outdoor floor system described herein weighs only 8-10 lbs/sq ft combined weight of the outdoor floor system and an average weight of a ¼"-½" gauged stone or tile, which falls within the "10-15 lbs/sq ft of dead load calculations for residential deck construction. Under these conditions the system can be placed over conventionally framed deck structures with joist spacing 16"-24" on center. A roof top terrace will also only need to be designed for standard load conditions. Paver deck applications will be 10-20 lbs/sq ft dead load and will require additional structural reinforcement and consultation with a licensed structural engineer.

The system can cover an existing cracked patio if the sub-grade is stable. The finished patio can be installed as a level surface with positive drainage, and no cracks will migrate through the new finished stone surface. It can also be placed over any solid bearing surface.

The high strength structural panel members have dimensional stability and minimal deflection under load conditions and require no additional surfacing material to achieve strength. This solid substrate adds reinforcing strength to a stone/tile surface and bearing strength to a dry-laid paver surface.

The system further provides lateral strength or side-to-side stability, achieved in part by using adhesive to bond panel edges edge-to-edge, and by the use of screws or a mastic material applied to the component in contact with the deck/deck framing, and or through the use of the support guide and support rod arranged in a cross or horizontal pattern with adjacent component assemblies.

Accordingly, a system and method are provided whereby a deck surface of quarried stone is feasible. The use of the fiber reinforced polymer structural panels, the connectors and the adhering of the stone tiles results in a lightweight high strength system weighing only 8 to 10 pounds per square foot in the preferred embodiment. The bonding of the surface material to the structural panel provides further strength to the overall system. As noted above, other surface materials may be employed, including but not limited to tile, brick, concrete and stone pavers.

Under an ASTM # E72-98 test, an exemplary system withstood 6282 lbs. of force with no failure, a maximum 1.47" deflection and a maximum 0.35" set deflection.

The components of the system described herein provide a strong yet light-weight precise height adjustable underlayment assembly for a durable and secure exterior flooring surface for elevated decks and rooftop terraces, supplying strength, durability and creative flexibility.

While certain features and aspects have been described with respect to exemplary embodiments, one skilled in the art will recognize that numerous modifications are possible. Moreover, while the procedures of the methods and processes for building, assembling and using the flooring support system described herein are described in a particular order for ease of description, unless the context dictates otherwise, various elements may be reordered, added, and/or omitted in accordance with various embodiments. Moreover, system components described according to a particular structural architecture and/or with respect to one system may be organized in alternative structural architectures and/or incorporated within other described systems. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A fastening system for laterally constraining a planar, structural panel made of an array of four-sided open cells each with an interior bottom perimeter flange defining a cell opening, that is used as a substrate for the support of a finish flooring, comprising:

a base mounting plate, said base mounting plate comprising a cylindrical disk with a planar top face, a bottom face, and at least one of a post locking orifice between said top face and said bottom face, a detachable post, insertable into said said post locking orifice to connect to said base mounting plate so as to extend normally from said planar top face of said base mounting plate and into said panel; and a post block retainable within said interior bottom perimeter flange of said structural panel, said post block having a side wall defining a thickness of said post block and wherein a central through bore is formed there through said post block;

wherein said post is sized for frictional engagement with said post block when said post is put into said central through bore.

2. The fastening system of claim 1 further comprising:

a series of radial tabs extending normally from a side of said post;

a series of radial slots formed in the base mounting plate adjacent to a top end of said at least one post locking orifice;

wherein said radial slots are matingly conformed to said radial tabs for insertion and locking rotation into said base mounting plate.

3. The fastening system of claim 2 further comprising a hex slot formed in a top end of said post, said hex slot sized to accept hex wrenches for the removal of said post from the base mounting plate through said cell.

4. The fastening system of claim 2 wherein said post block has a flanged top face larger than said opening in said bottom perimeter flange with a remainder of said post block approximating a size of said bottom openings in the bottom face of the structural panel, and wherein said post block has a thickness that approximates a thickness of said interior bottom perimeter flange.

5. The fastening system of claim 1 further comprising a hex slot formed in a top end of said post, said hex slot sized to accept hex wrenches for the removal of said post from the base mounting plate through said cell.

6. The fastening system of claim 1 wherein said post has a height along a linear axis that exceeds said thickness of said post block such that said post will extend into said cell beyond said cell bottom flange when said structural panel is placed atop said base mounting plate.

7. The fastening system of claim 1 further comprising:

a set of evenly radially spaced, tabs that form a ring of teeth about an outer perimeter of a bottom face of said base mounting plate, wherein said first ring of teeth are engageable with a matingly engageable, second ring of teeth formed on an outer perimeter of a top face of a system component.

8. A fastening system for laterally constraining a planar, structural panel made of an array of open cells each with an interior bottom perimeter flange defining a cell opening, that is used as a substrate for the support of a finish flooring, comprising:

a base mounting plate, said base mounting plate comprising a planar disk with a top face, a bottom face, and post locking orifices between said top face and said bottom face, a post connectable to said base mounting plate so as to extend normally from a said top face of said base mounting plate and into said panel;

a post block retainable within said interior bottom perimeter flange of said structural panel, said post block having a side wall defining a thickness of said post block wherein a central through bore is formed there through said post block, and wherein said post is sized for frictional engagement with said post block when said post is put into said central through bore;

a series of radial tabs extending normally from the side of said post;

a series of radial slots formed in said base mounting plate adjacent to a top end of said lock orifices, wherein said radial slots are matingly conformed to said radial tabs for insertion and locking rotation into said base mounting plate;

a series of grooves formed on a side wall of said post block from which extends a series of spring locking clips; and a series of angled locking lugs formed at an end of said locking clips at a distance from said flanged top face that is equal to a thickness of the internal cell flange of said structural panel;

wherein said post block has a flanged top face larger than said opening in said bottom perimeter flange with a remainder of said post block approximating a size of said bottom openings in the bottom face of the structural panel, and wherein said post block has a thickness that approximates a thickness of said interior bottom perimeter flange.

* * * * *